(12) United States Patent
Sampson

(10) Patent No.: US 11,153,639 B2
(45) Date of Patent: *Oct. 19, 2021

(54) MEDIA DISTRIBUTION AND MANAGEMENT SYSTEM AND APPARATUS

(71) Applicant: GT SYSTEMS PTY LTD., Surry Hills (AU)

(72) Inventor: Keith Rhett Sampson, Surry Hills (AU)

(73) Assignee: GT SYSTEMS PTY LTD., Surry Hills (AU)

( * ) Notice: Subject to any disclaimer, the term of this patent is extended or adjusted under 35 U.S.C. 154(b) by 0 days.

This patent is subject to a terminal disclaimer.

(21) Appl. No.: 16/865,464

(22) Filed: May 4, 2020

(65) Prior Publication Data

US 2020/0336784 A1    Oct. 22, 2020

Related U.S. Application Data

(63) Continuation of application No. 15/523,960, filed as application No. PCT/AU2015/000661 on Nov. 4, 2015, now Pat. No. 10,652,612.

(30) Foreign Application Priority Data

Nov. 4, 2014    (AU) ................................ 2014904438

(51) Int. Cl.
| | | |
|---|---|---|
| *H04N 21/4367* | (2011.01) | |
| *G06Q 10/06* | (2012.01) | |
| *G06Q 50/10* | (2012.01) | |
| *H04N 21/63* | (2011.01) | |
| *H04L 29/06* | (2006.01) | |
| *H04L 29/08* | (2006.01) | |
| *H04N 21/2383* | (2011.01) | |

(Continued)

(52) U.S. Cl.
CPC ......... *H04N 21/4367* (2013.01); *G06Q 10/06* (2013.01); *G06Q 50/10* (2013.01); *H04L 63/20* (2013.01); *H04L 67/06* (2013.01); *H04N 21/2383* (2013.01); *H04N 21/4227* (2013.01); *H04N 21/4627* (2013.01); *H04N 21/482* (2013.01); *H04N 21/632* (2013.01); *G06Q 20/123* (2013.01)

(58) Field of Classification Search
CPC .......................... H04N 21/235; H04N 21/2552
See application file for complete search history.

(56) References Cited

U.S. PATENT DOCUMENTS 8,181,262 B2 * 5/2012 Cooper ............... H04L 63/0853
726/28
8,578,410 B2 * 11/2013 Swart .................. H04N 21/658
725/36

(Continued)

*Primary Examiner* — Mushfikh I Alam
(74) *Attorney, Agent, or Firm* — Mark M. Friedman

(57) ABSTRACT

A network appliance which receives digital content from a remote location; said appliance including decoding and recoding means by which digital content is downloaded, decoded then recoiled for on-transmission to a digital device for consumption by a user. In a particular form each network appliance operates according to secure peer assist criteria; said secure peer assist criteria enabling reception of at least portions of said item of content from others of said plurality of network appliances if said item of content has been previously downloaded to said others of said plurality of network appliances.

12 Claims, 21 Drawing Sheets

(51) Int. Cl.
*H04N 21/4227* (2011.01)
*H04N 21/4627* (2011.01)
*H04N 21/482* (2011.01)
*G06Q 20/12* (2012.01)

(56) References Cited

U.S. PATENT DOCUMENTS

| | | | | |
|---|---|---|---|---|
| 2004/0015995 | A1* | 1/2004 | Shao | H04N 21/4383 |
| | | | | 725/87 |
| 2006/0248553 | A1* | 11/2006 | Mikkelson | H04H 60/27 |
| | | | | 725/23 |
| 2009/0006498 | A1* | 1/2009 | Freedman | G06F 16/256 |
| 2009/0300673 | A1* | 12/2009 | Bachet | H04L 67/104 |
| | | | | 725/31 |
| 2010/0146569 | A1* | 6/2010 | Janardhan | H04N 7/17318 |
| | | | | 725/98 |
| 2012/0079578 | A1* | 3/2012 | Dachiraju | A61N 5/0618 |
| | | | | 726/7 |
| 2016/0156942 | A1* | 6/2016 | Bao | H04L 65/60 |
| | | | | 725/116 |

* cited by examiner

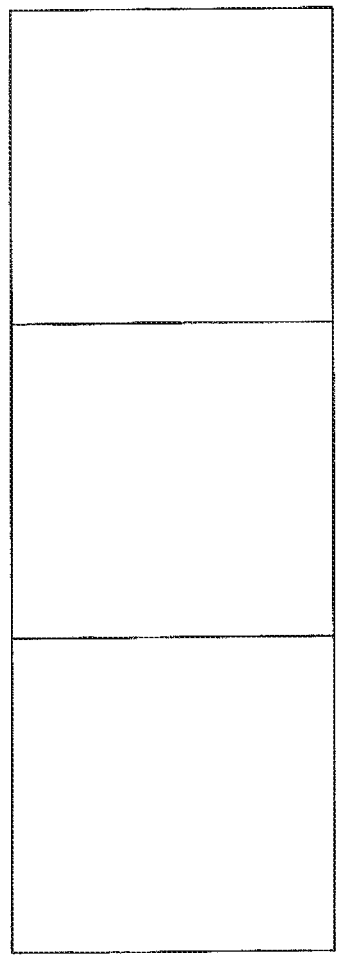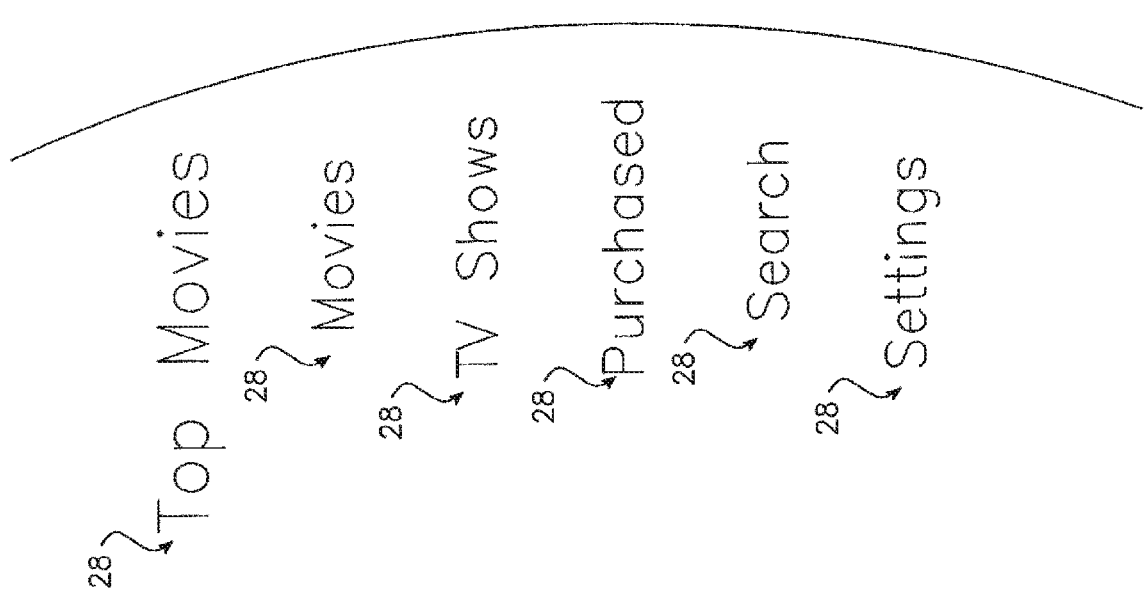
Fig. 4A

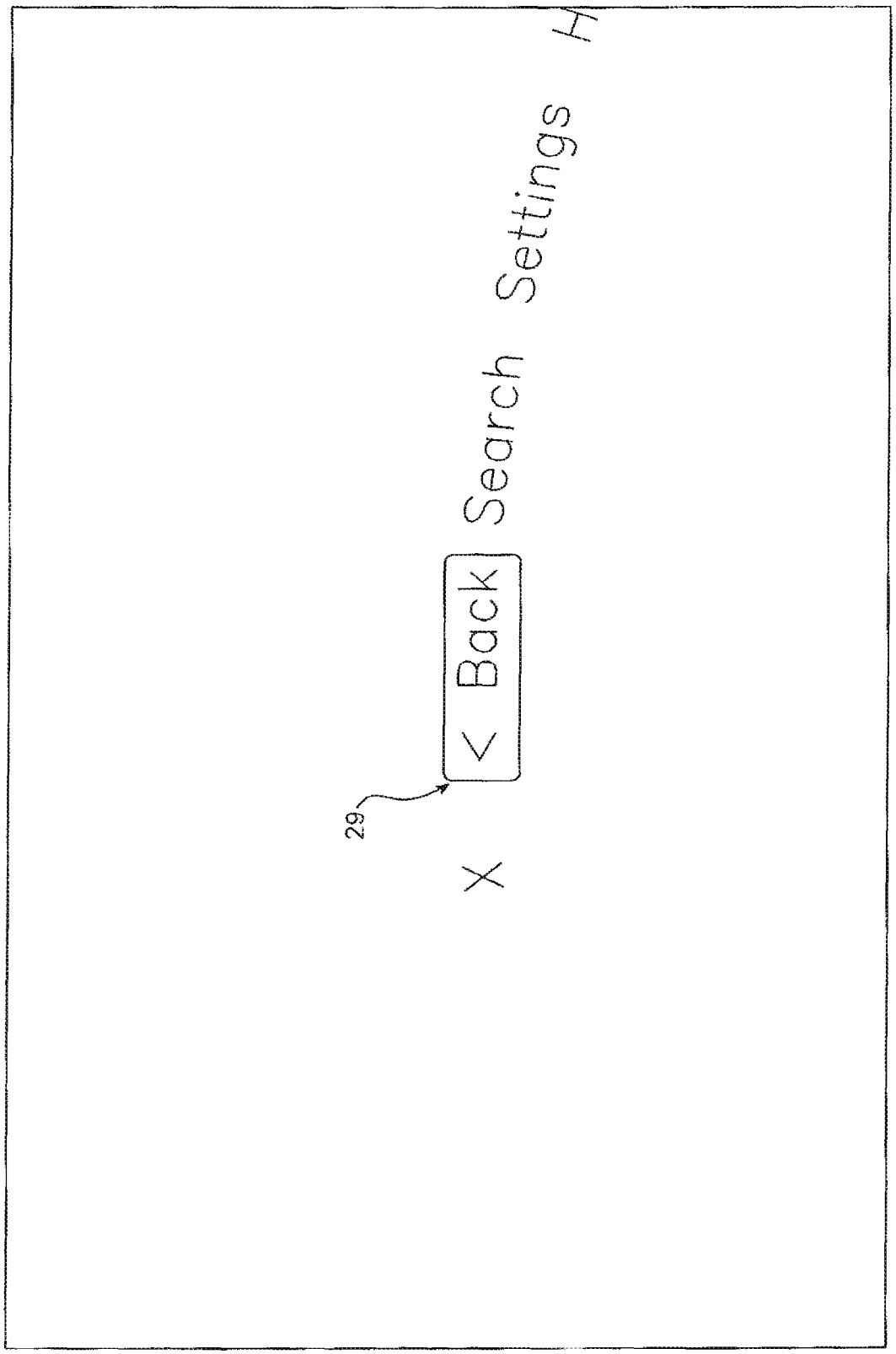

Captain America: The Winter Soldier ⬜HD ⬜R

After the cataclysmic events in New York with the Avengers, Marvel's "Captain America:
The Winter Soldier" finds Steve Rogers, aka Captain America, living quietly in Washington
D.C. and trying to adjust to the modern world. But when a S.H.I.E.L.D colleague comes Details
Action and adventure
Released 2014
136 minutes
1080p
***** (25)

Language
English (Dolby 5.1)
Subtitles
Cantonese
French
Indonesian
Malay
Thai

Actors
Chris Evans
Samuel L. Jackson
Scarlett Johansson
Robert Redford
Sebastian Stan
Anthony Mackie
Cobie Smulders Director
Anthony Russo
Joe Russo Screen Writers
Christopher Markus
Stephen McFeely CAPTAIN AMERICA
The Winter Soldier

[Trailer] ← 29

<Back

Buy HD
$7.99

Rent HD
$2.99

Mor

Fig. 4F

MEDIA DISTRIBUTION AND MANAGEMENT SYSTEM AND APPARATUS

TECHNICAL FIELD

The present invention relates to a media distribution and management system and more particularly but not exclusively, to such a system when implemented utilising a network termination unit (NTU) or an Internet appliance which engages with internet infrastructure to deliver and control digital content including (but not limited to) streamed and downloaded digital content to digital devices including (but not limited to) television display units, video display units and the like.

BACKGROUND

There exist certain forms of content receipt and content viewing devices available to consumers. These include television "set top boxes" made available by media distribution companies. Well known versions in Australia include the Foxtel set top box and the Optus set top box. These devices are limited to receipt and delivery of content usually delivered via a cable arrangement.

Also known are certain forms of "Internet appliance" which receive digital content typically over the internet for delivery, usually via streaming, to television display units and the like. The "Apple TV" appliance is an example of such a device in current usage within Australia.

It is also known to stream digital content over the Internet to personal computers enlisting the aid of file sharing services such as BitTorrent. Such services and their protocols are highly insecure, not suited to streaming, often take a long time to start playback and are not conducive to features such as "jump" to a nominated point in the content.

A problem with these current devices and mechanisms for receipt and delivery of digital content is that current Internet infrastructure has variable upload and download speeds and it can be difficult, and in some instances impossible particularly for consumers in a household environment, to reliably receive real time or near real time content, especially high definition and ultra-high definition content or large file content On Demand.

Many if not all current Internet video distribution systems use Adaptive Bit Rate (ABR) technology to overcome the problem of video distribution On Demand via the Internet. However, ABR reduces bit rate and definition and degrades the user experience.

Separately, and in some cases in addition, the choice of content available to the consumer is limited by the proprietary nature of the appliance.

Further, current mechanisms for local control of the content and its delivery and display are not intuitive or "user friendly"

It is an object of the present invention to address or at least ameliorate some of the above disadvantages or provide a useful alternative.
Notes The term "comprising" (and grammatical variations thereof) is used in this specification in the inclusive sense of "having" or "including", and not in the exclusive sense of "consisting only of".

The above discussion of the prior art in the Background of the invention, is not an admission that any information discussed therein is citable prior art or part of the common general knowledge of persons skilled in the art in any country.

SUMMARY OF INVENTION

Accordingly in one broad form of the invention there is provided, a network appliance which receives digital content from a remote location; said appliance including decoding and recoding means by which digital content is downloaded, decoded then recoded for on-transmission to a digital device for consumption by a user.

Preferably the digital content is recoded according to secure HDMI coding algorithms.

Preferably said network appliance received said digital content according to criteria comprising one or more of:
  a. most needed packet
  b. fastest download speed
  c. least latency
  d. the network address from where the next digital bit or group of bits can most easily and efficiently be acquired in order to maintain real-time or near real-time delivery of digital content.

In yet a further broad form of the invention there is provided, a Web server which aggregates items of digital content for subsequent on forwarding according to a secure methodology of at least a portion of a copy of an item on request from a network appliance located at a remote location.

Preferably said secure methodology comprises, obtaining and forwarding packets of data forming said digital content according to one or more of the following criteria:
  a. most needed packet
  b. fastest download speed
  c. least latency
  d. the network address from where the next digital bit or group of bits can most easily and efficiently be acquired in order to maintain real-time or near real-time delivery of digital content.

In yet a further broad form of the invention there is provided, a method of assembling an item of digital content; said method comprising receiving at least a first portion of the item of digital content from an origin store of digital content located at a remote location.

Preferably the method further includes obtaining and forwarding packets of data forming said item of digital content according to one or more of the following criteria:
  a. most needed packet
  b. fastest download speed
  c. least latency
  d. the network address from where the next digital bit or group of bits can most easily and efficiently be acquired in order to maintain real-time or near real-time delivery of digital content.

In yet a further broad form of the invention there is provided, a distributed system for delivery of digital content; said system comprising at least one content aggregator in communication with an origin store; a plurality of network appliances; the aggregator receiving digital content in the form of items of content; the aggregator securing the digital content for distribution by the system; the origin store making available the digital content to said plurality of network appliances; each network appliance receiving specified items of content on request to said system by a said network appliance.

Preferably said system communicates over the Internet.

Preferably each network appliance operates according to secure peer assist criteria; said secure peer assist criteria enabling reception of at least portions of said item of content from others of said plurality of network appliances if said item of content has been previously downloaded to said others of said plurality of network appliances.

In yet a further broad form of the invention there is provided, a system for ingesting, aggregating curating, managing, publishing, searching, selling, distributing and settling the purchase of digital content; said system operating according to the method described above.

Preferably the step of settling includes paying content owners and retailers for specified items of digital content according to complex rights and release window agreements.

In yet a further broad form of the invention there is provided, a method of syndicating the system described above thereby to allow a plurality of Internet retailers to sell digital content transmitted according to the methods described above.

BRIEF DESCRIPTION OF DRAWINGS

Embodiments of the present invention will now be described with reference to the accompanying drawings wherein.

DESCRIPTION OF EMBODIMENTS

First Preferred Embodiment

Figure 1:
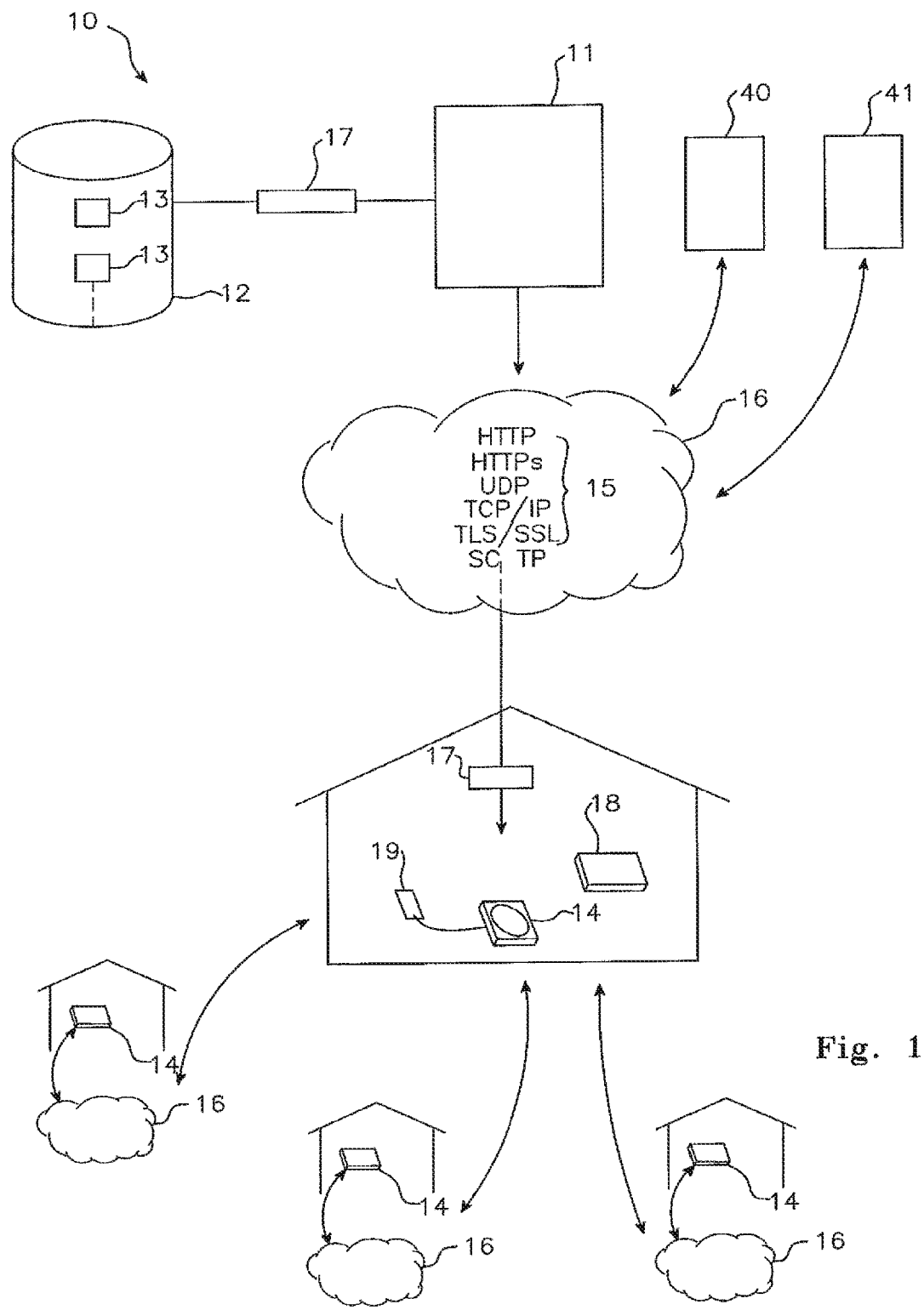
FIG. 1 is a block diagram of a media distribution and management system in accordance with a first embodiment of the present invention.

With reference to FIG. 1 there is illustrated a block diagram of a media distribution and management system 10 in accordance with a first preferred embodiment.

In this instance the system 10 includes an origin store 11 (sometimes termed a "Superpop" in parts of this specification). The origin store 11 may be implemented as a single server or may itself be a network of servers. In particular commercial implementations, the servers may form part of a commercial partner content distribution network. The origin store 11 is in communication with various databases 12 which contain digital content 13 available for licensed use (usually, but not always, subject to negotiation of appropriate terms). The origin store 11 receives the digital content 13 usually as "wrapped" content meaning that digital rights management (DRM) has been applied to the content.

The origin store 11 makes this content 13 available to subscribers or purchasers by way of a network appliance 14. The network appliance 14 is located at or close to the point of consumption of digital content 13.

In accordance with embodiments of the present invention the network appliance 14 can receive digital content 13 from the origin store 11 directly in accordance with communication protocols 15 commonly available when communicating via the Internet 16. Most commonly it is expected that communication will be via the Internet 16 but other structures can be contemplated which facilitate use of the protocols 15. The digital content 13 may be secured from the point of ingest to the network appliance 14 by use of one or more of the following security technologies and features:

Secure ingest via Aspera to the Platform's secure environment

All master asset storage and processing remains within the Platform's approved secure environment
Mezzanine storage in the Platform secure storage
Transcode on the Platform secure transcode farms
DRM wrap on the Platform secure Microsoft PlayReady server
Transfer of DRM wrapped assets to EdgeCast origin store [11] from the Platform Another embodiment includes separate secure ingest, mezzanine storage, transcode and DRM wrapping on and in Motion Picture Association of America approved facilities.

All rights and entitlements managed by the Platform and Microsoft PlayReady

Distribution via EdgeCast network of super PoP's and Secure Peer Assist™ to network appliance hardware Trusted Execution Environment (TEE) with secure PlayReady client The system is designed for multi-layered security from the ground up network appliance secure DRM transcode in TEE to secure HDMI HDCP connection to TV network appliance network access is secured by Public Key Infrastructure (PKI) security and certificates The communication structures and algorithms programmed into the aggregator database 12 and the network appliances 14 are such that content 13 is initially obtained from the aggregator database 12 typically over the Internet 16 following an initialisation sequence which permits a given network appliance 14 access to and use of a specified item 17 of digital content 13. Again, but not necessarily always, permission will be subject to negotiation of commercial terms in advance of access being provided to the specified item 17.

Once all or part of the specified item 17 has been downloaded to a given network appliance 14 it can be "played" by that appliance. Most usually the appliance will output secure e.g. HDMI HDCP digital content to an audio-visual display device 18 such as a television set. In other embodiments it can be streamed securely wirelessly or via Ethernet to other devices such as tablets and phones and TVs. In other cases it may be game content that is played on the appliance or "side loaded." wirelessly or via Ethernet or some other method to gaming devices such as other gaming platforms.

A feature of the present system 10 is that if another network appliance 14 negotiates and requests access to the same specified item 17 the content may be downloaded (or portions of it) from either the origin store 11 or the network appliance 14 which already has that specified item 17 stored on it.

As to which source to use that will be determined according to network knowledge and secure peer assist criteria 19 which include:
 a. most needed packet
 b. fastest download speed
 c. least latency
 d. the network address from where the next digital bit or group of bits can most easily and efficiently be acquired in order to maintain real-time or near real-time delivery of digital content.

Routing information may be distributed and/or centralised and may be in the form of hash tables or other efficient database mechanisms. This detailed knowledge combined with control of network appliances 14 and routing is a form of software defined networking (SON).

Figure 2:
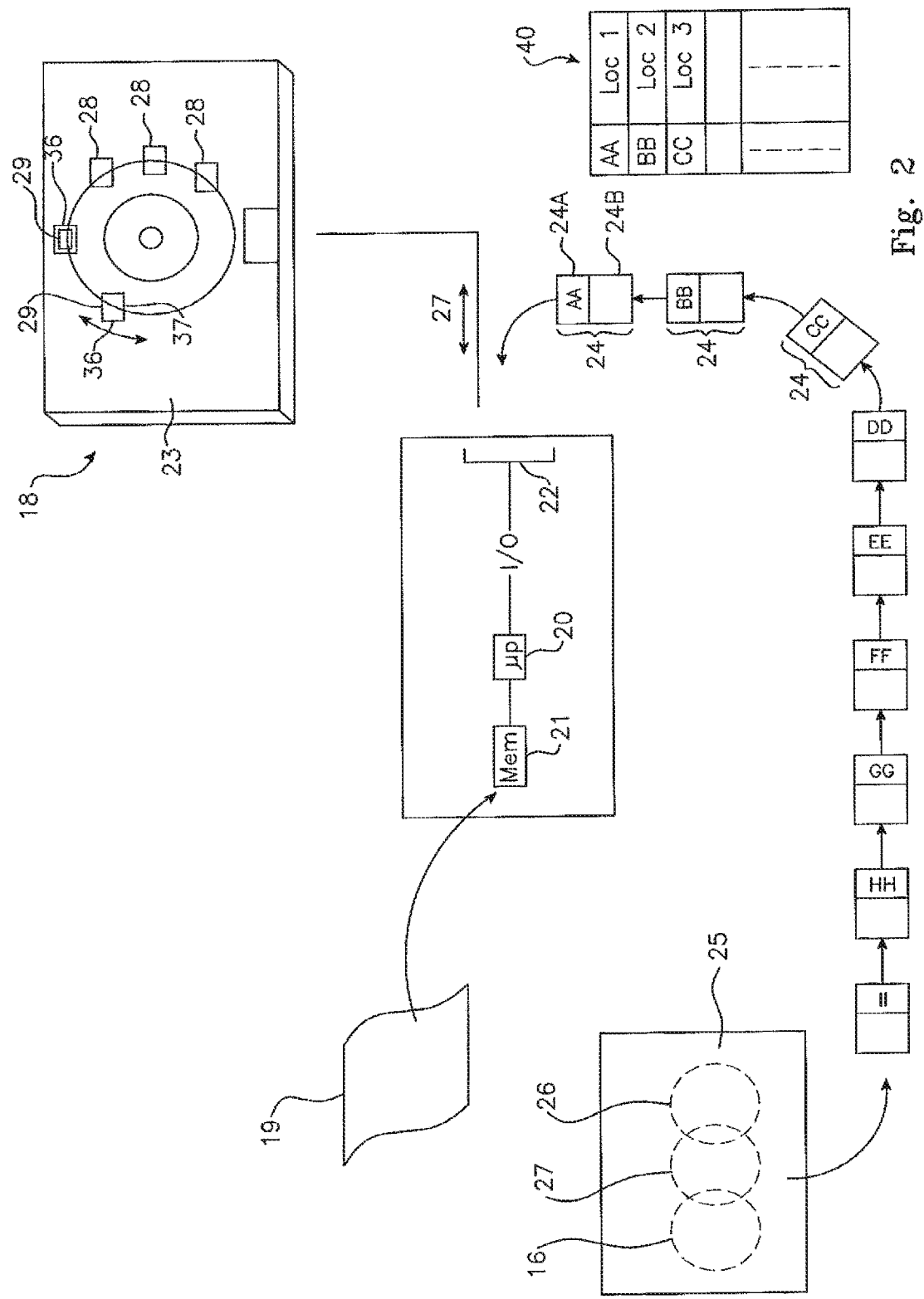
FIG. 2 is a block circuit diagram of a network appliance usable in conjunction with the system of FIG. 1.
Figure 3:
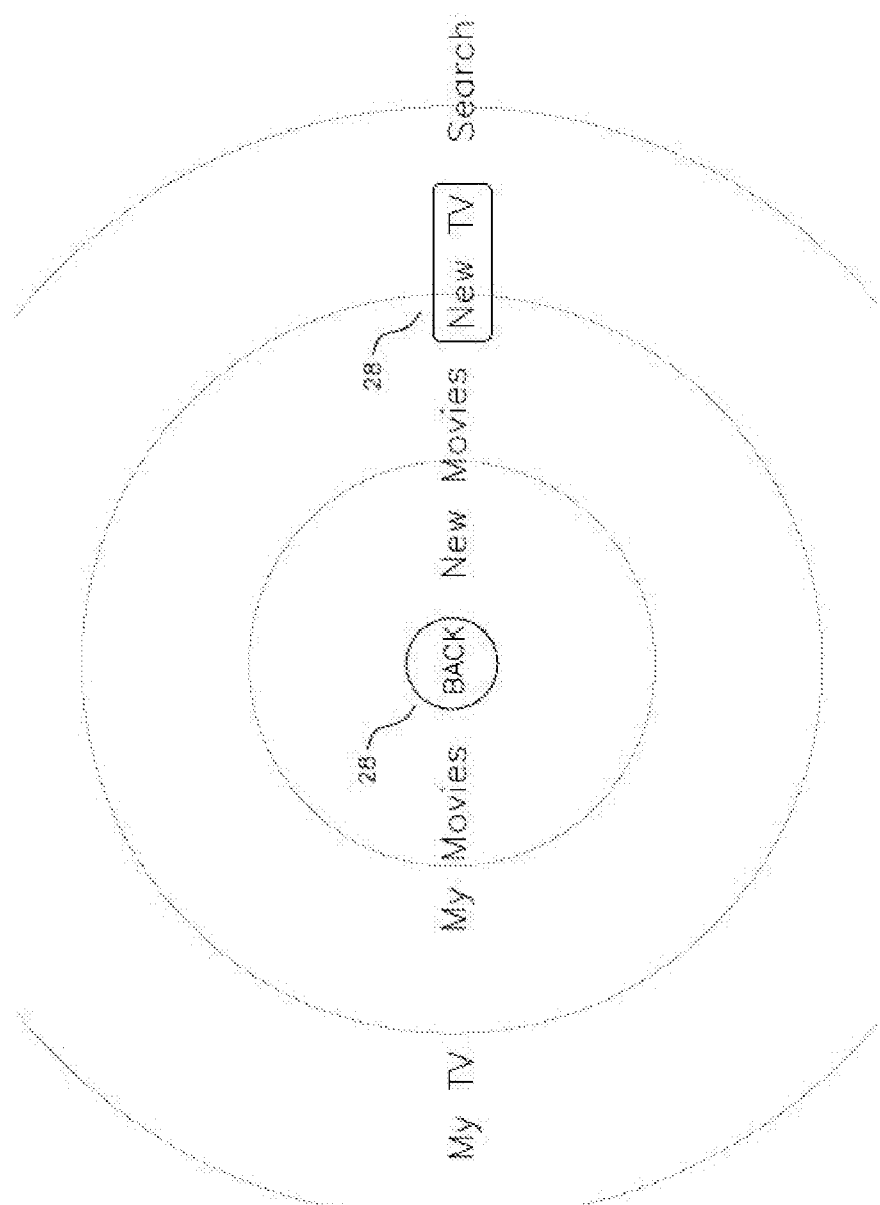
FIG. 3 is a video output view showing graphical structures that are utilised interactively with the modes of operational control of the appliance of FIG. 2.

Specifically "network knowledge" includes address information for all data packets that will form digital content 13 and, more particularly, at any one time address information for all data packets that form part of a specified item 17. This data packet address information may be stored in a database 40 as shown in FIG. 2 wherein each individual address, for example address AA of respective data packet 24 is linked to a location, location loci in this instance.

The database 40 may be stored on or form part of the origin store 11 or it may be a separate server. In other instances it may be stored, at least partially, in memory 21 of the individual network appliances 14 in order to provide a distributed storage arrangement. It will be understood that over time there will become available a significant number of sources distributed over a wide area from which a specified item 17 may be downloaded (in whole or in part).

As to which source to use may be determined in conjunction with telcos and ISPs in order to optimise use of their networks and minimise costs to consumers, the telcos and ISPs and the service operator. This may take the form of "unmetered content" agreements for Secure Peer assist traffic that remains within a network operator's domain.

Commercially different models can be used as to upon what basis the specified item is permitted to be downloaded or streamed to a specific network appliance 14. For example the model may be based upon "pay as you go" such as pay-per-view or rent or download to own.

In the alternative it can be based upon a subscription model.

One example of the network appliance 14 will be described in more detail below however it should be understood that a processor programmed to provide the above described functionality can be located within a smart phone or a smart TV or a games controller—it does not need to be limited to a specific standalone dedicated network appliance 14.

The combination of super PoP CON and Secure peer assist criteria ensures optimum delivery. Video packets are sourced from the best available location. The network of network appliance nodes provides the optimum network architecture: intelligence and storage at the furthest edge the network, i.e. the customer premises. This is reinforced by a master super PoP to fill any gaps. This architecture ensures that we drive the user's connection at maximum bandwidth whilst minimising hierarchical network traffic and inter-network peering. Network protocols and parameters have been optimised based on experience.

The Secure peer assist criteria and applications programs based on them are aware of and report network traffic at the SCTP, TCP/IP, UDP and video packet level. Each network appliance 14 forms an intelligent node in a mesh network. This may be sometimes described as grid computing or distributed cloud computing. We combine distributed and centralised routing information and intelligence down to the video packet level. This enables optimum management of the network with Software Defined Network like capability.

Secure peer assist criteria permits formation of an entire ecosystem for video and game delivery management via the Internet. Each network appliance 14 monitors metrics and statistics at the network and video packet level, reporting traffic and video state in real time. Combined with video asset management and distribution platform and Super PoP CDN, there is provided comprehensive quality of service (QoS) monitoring and control for the entire network. Secure peer assist criteria provides a very efficient method of video distribution via the Internet, minimizing network load and maximising network and customer viewing performance. Secure peer assist criteria may also be implemented in Consumer Electronics (CE) apps.

Secure peer assist criteria 19 extends network reach beyond the edge, right to customers' homes. Secure peer assist criteria 19 may be architected to take advantage of the modern Internet: reasonably high customer premises tail speeds with fibre backhaul from the exchange. Secure peer assist criteria architecture uses the network of network appliance nodes which are each programmed with the secure peer assist criteria 19 combined with a Super PoP CDN architecture, to drive the user's connection at maximum capacity, thereby ensuring that content is delivered in the highest quality, without perceptible interruptions.

In preferred forms the digital content 13 stored on the origin store 11 may be syndicated. For example the stored digital content 13 may be supplied as a store portal on anyone's web site just like YouTube puts a portal on web sites. The participating site owner may choose a sub-catalogue of titles from a master catalogue that are relevant to their audience.

The aggregator database 12 may include the following technologies in order to assist in applying appropriate security to the digital content 13 prior to delivery to the origin store 11:
 Designed for security in layers from the ground up
 The Secure Peer Assist network is designed to be secure, hidden and not discoverable
 The Secure Peer assist network management system is protected by PKI and secure certificates Secure Peer assist is "invisible" to BitTorrent Networks and is not analogous in its protocols to such networks All Secure Peer assist protocols are standard Internet protocols or secure protocols with PKI security and verification All digital content 13 is encrypted with Microsoft PlayReady DRM and secured within the network appliance TEE PlayReady DRM is implemented in the hardware of the appliance within its trusted execution environment (TEE)

The appliance operating system is fully integrated with and utilises the hardware DRM to secure the media pipeline In one embodiment, the appliance operating system may be Microsoft Windows PlayReady key management is completely separate from and additional to network appliance TEE security and key management.

PlayReady DRM and decrypt is secured by the network appliance TEE

Key management and storage is performed within a secure application and environment on the appliance In one embodiment, that secure key management system may utilise innovative secure enclave environments enabled by the processor architecture, instruction set, libraries, Application Programming Interfaces (APIs) and attestation services.

User Interface

With reference to FIG. 2 the network appliance and an example visual display device 18 are shown in greater detail.

In this instance the network appliance 14 includes a processor or microprocessor 20 in communication with a memory 21. The microprocessor 20 is in communication with an input output device 22 by which signals can be sent to and received from an external digital device which preferably includes at least a visual display 23. The processor or microprocessor may include a graphics processing unit (GPU) or that GPU may be a separate processor, system or sub-system.

The memory contains code including code corresponding to the secure peer assist criteria 19 which enables the processor 20 to effect various functions including sending and receiving digital content 13 over a network 25. The network 25 may include the Internet 16, local area networks 26 and wide area networks 27 all intercommunicating with each other.

The digital content 13 will typically comprise a plurality of data packets 24 each of which comprises a header 24A and a payload 24B.

The payload 24B comprises digital data which may more specifically be audio data, video data, game data or other data.

Figure 8:
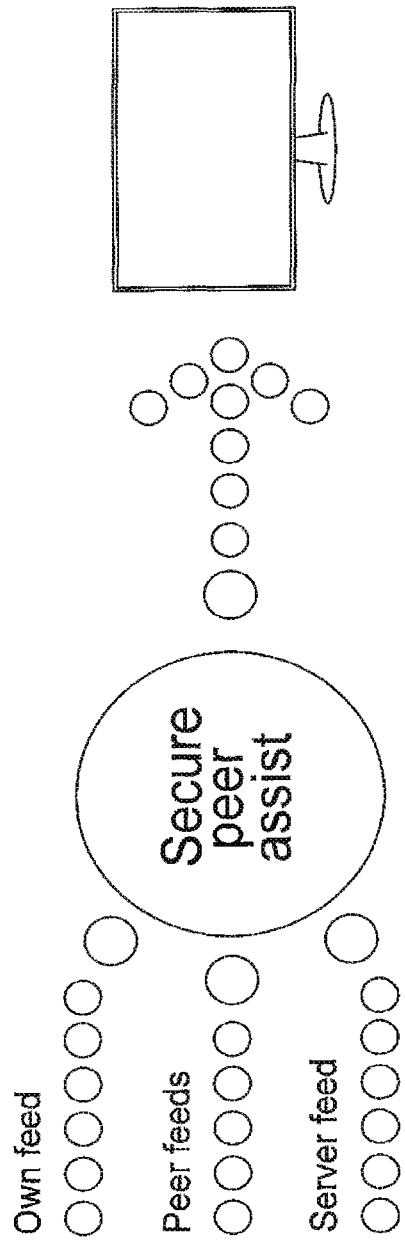
FIG. 8 is a flow diagram of data packet sources and data packet flow which may contribute in whole or in part to delivery of digital content under the system of FIG. 5.
Figure 9:
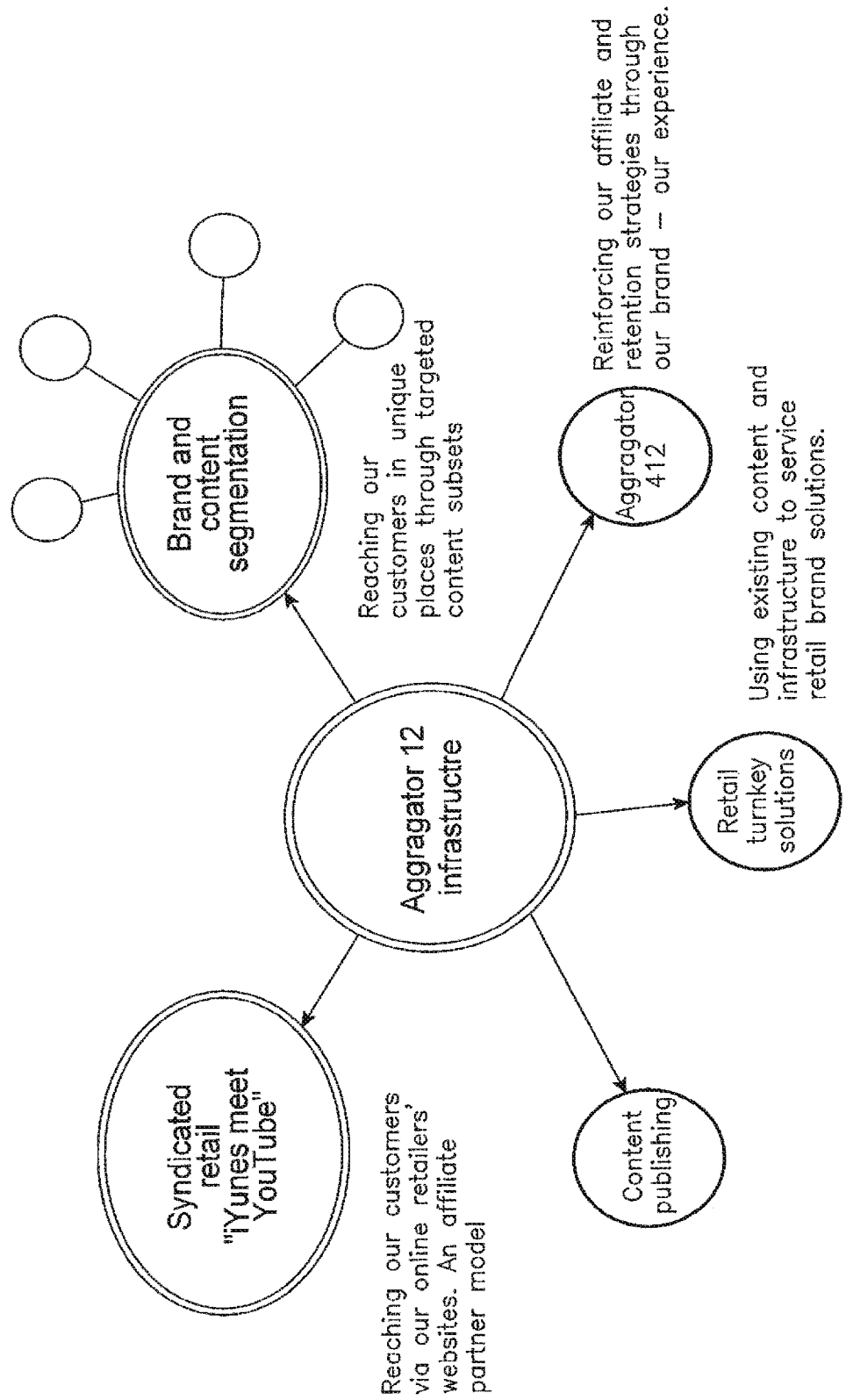
FIG. 9 is a conceptual diagram of the entire system of FIG. 5 including a methodology for syndication.

It is to be noted that the packets 24 will not necessarily arrive at the appliance 14 in sequential order. In a typical scenario different packets will arrive from different origins-in that regard refer to FIGS. 8 and 10.

The core function of the network appliance 14 is to controllably send and receive digital content 13 and to convert that digital content 13 locally into local signals 27 for driving an external digital device such as (but not limited to) audiovisual display device 18.

A further function of the network appliance 14 is to permit a user to control the "purchasing" and "playing" of digital content received by or sent from the network appliance 14.

In the preferred form, the user experience and user interface are kept as simple as possible. In the simplest form user control is effected simply by moving a cursor left or right via a remote control device. These actions control extremely simple menus and displays of content on the screen. These may be homogenous or blended i.e. pure menu or pure content display or a mixture of both. In one preferred form the displays are arcs or circles to reflect the user experience and control via the remote control device. In cases where there are a lot of items to display such as a large content library, the display may be concentric arcs or circles of content "tiles" i.e. clean graphical images of the "cover" of the content title. In another embodiment these tiles may be in a grid formation.

Navigation of menus is achieved by simple combinations of "left" and "right" navigation. At its simplest, a menu of action items may be navigated left or right by clicking left or right. In one example the menu may move correspondingly left and right under a selection graphical device such as a cursor box. In another example the selection graphical device may move left or right. Once highlighted, a menu item is selected by a simple single click. This may result in an action or in navigating deeper into the menu structure. Navigation "out" may be by double click. Alternately there may be menu navigation items such as "back" or "cancel". For navigation of large numbers of objects such as video libraries, these may be displayed in concentric arcs or rings or in a grid of tiles. The rings may be navigated "in" by clicks and "out" by double clicks and left and right by clicking left or right. Items, tiles, arcs or rings selected may be highlighted by increasing focus and/or size. Items, tiles, arcs or rings not currently selected may be reduced from focus by moving away from the centre of focus and/or "defocussing" the items or reducing them in size. This may give the effect of unselected items, tiles, arcs or rings moving "away" form the user and selected items, arcs or rings moving "toward" the user.

More sophisticated use may be supported by control mechanisms such as rate or distance dependent actions. A small action may result in a slow, short movement of the menu or item. A larger action may result in a faster, longer movement of the menu or item. Similarly, the rate of action may also determine the scale or nature of the menu action. This may be independent of distance of action or related.

In the preferred form the user graphical display is very simple, clean, uncluttered and crisp to provide a feeling of simplicity and ease of use.

Figure 4B:
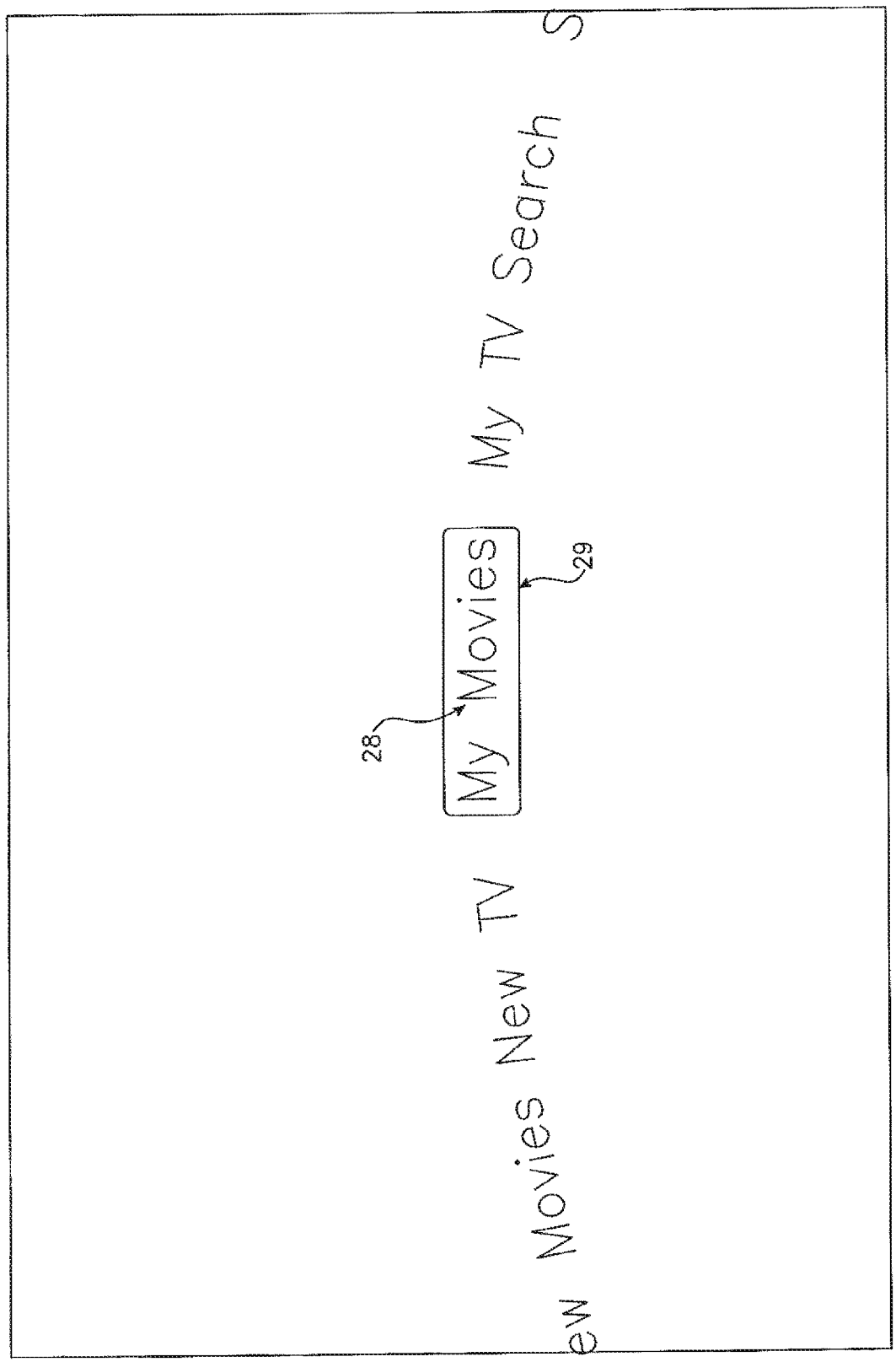
FIG. 4A through to 4F are video output views showing further graphical structures that are utilised interactively with the modes of operational control of the appliance of FIG. 2.
Figure 4C:
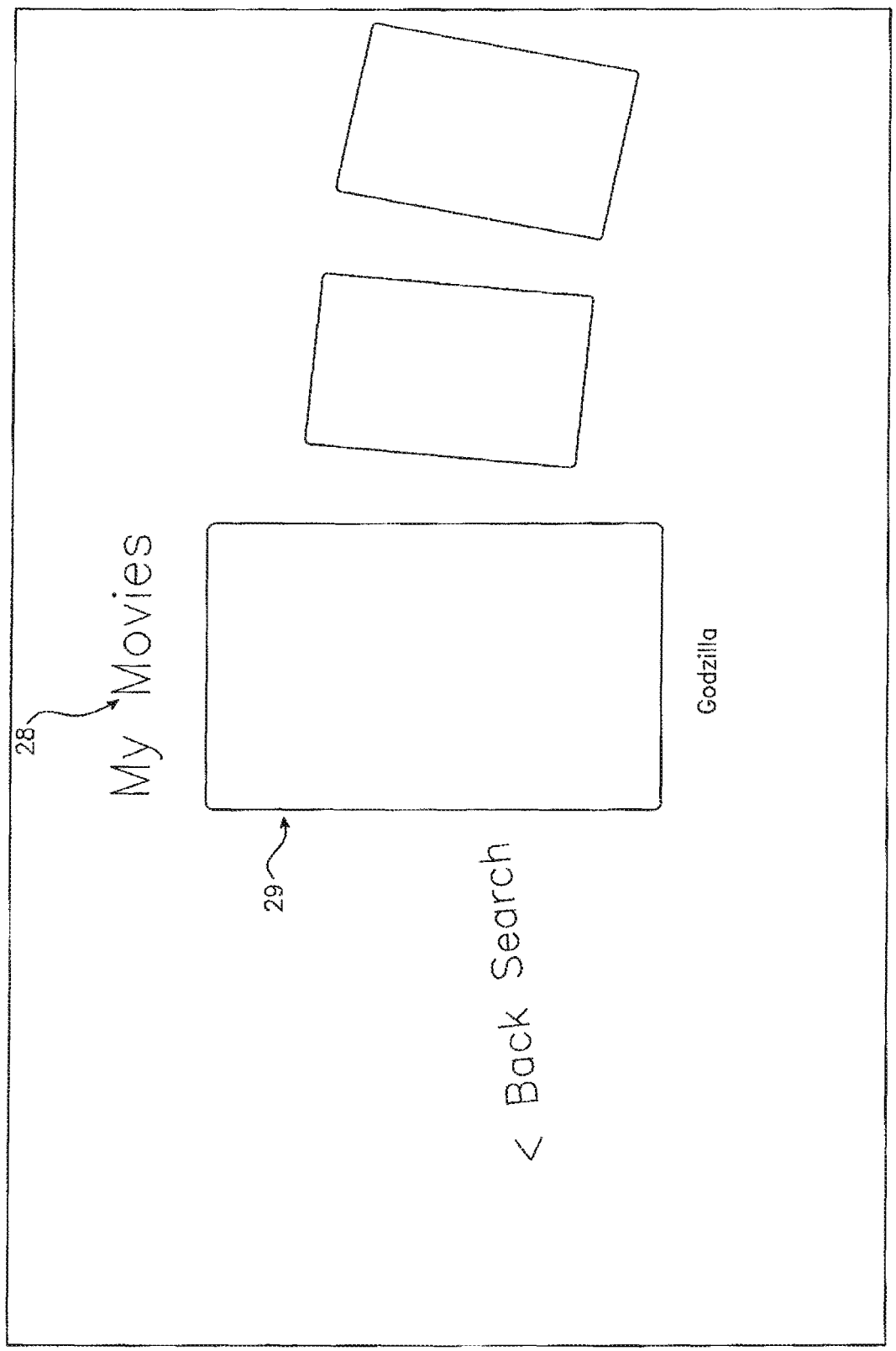

For example, with reference to FIG. 4A through to 4F a sequence of operation can be as follows: graphical structures 28 lie on a substantially vertically disposed arc are shown in FIG. 4A or maybe on a substantially horizontally disposed arc shown in FIG. 4B. A user manipulates the cursor 29 device to surround a chosen one of the graphical structures 28 for example to designate the "my movies" graphical structure.

Figure 4D:
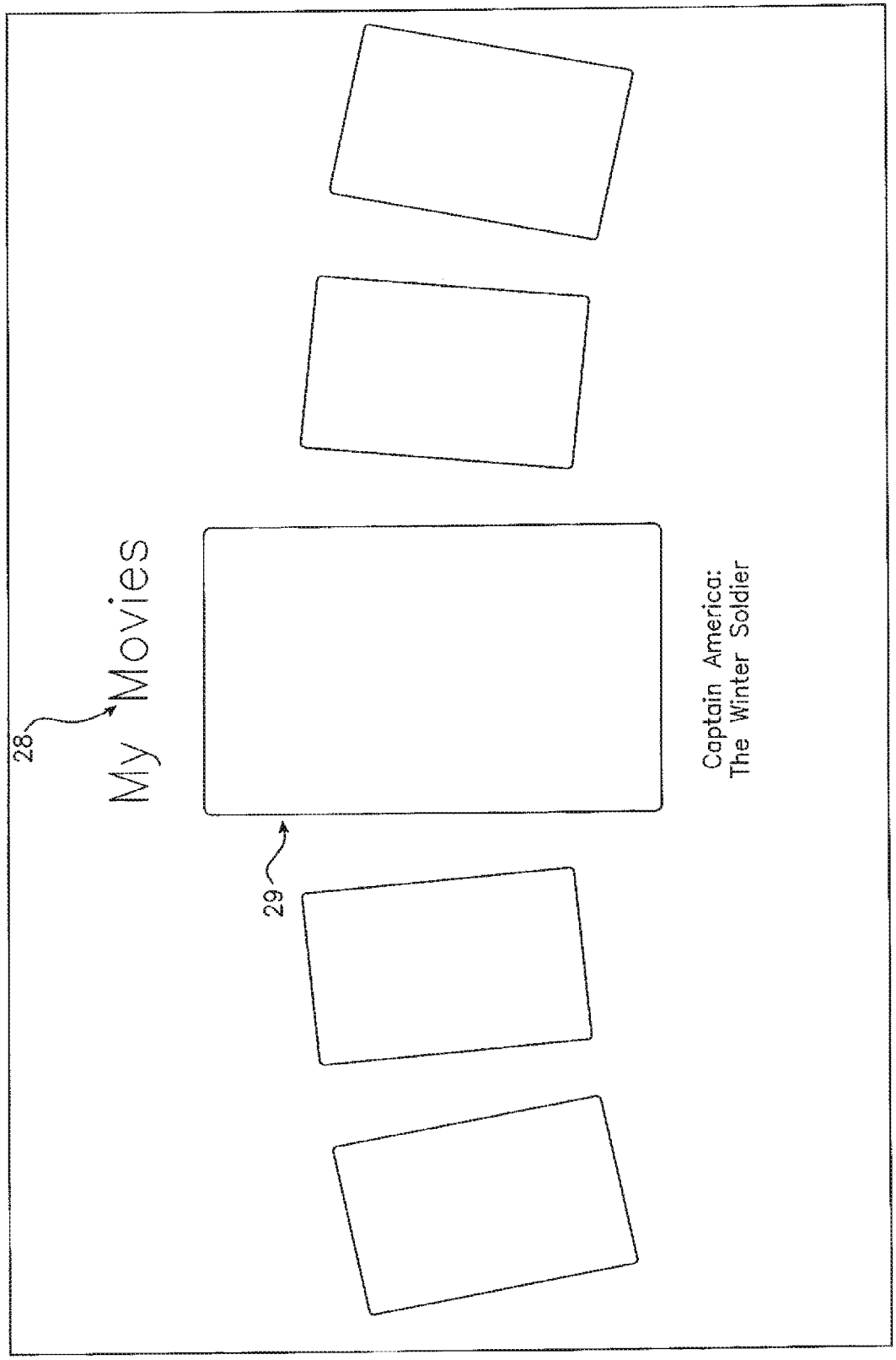

The user may then move the cursor through a series of, in this instance, movie selections to designate the "Capt America" movie selections as shown in FIG. 4D.

At any time a user may "back out" of the current menu item so as to move up one level to the series of graphical structures 28 shown in FIG. 4E. FIG. 4F shows details of a particular selection when the "Capt America." graphical structure was shown highlighted by the cursor 29 (FIG. 4D in a purchase menu in the store context obtainable from syndicated webstore 41—refer FIG. 6).

In another form this can be effected by control of a cursor 29 in the form of a rectangular-shaped border device in association with graphical structures 28 displayed on visual display 23, in this instance of audiovisual display device 18.

In a particular form the graphical structures 28 may lie on an arc or circular path.

In one form these controls may be "simulated" in a remote control application on for example a smart phone connected wirelessly or via the Internet to the main network appliance 14 or a "satellite" network appliance 14 forming a home network.

In another form these controls may be embodied in a TV remote controller or a game controller.

In another form these controls may be duplicated on a smaller version of the network appliance 14 wirelessly connected to the main network appliance 14 or a "satellite" network appliance 14 forming a home network.

Figure 5:
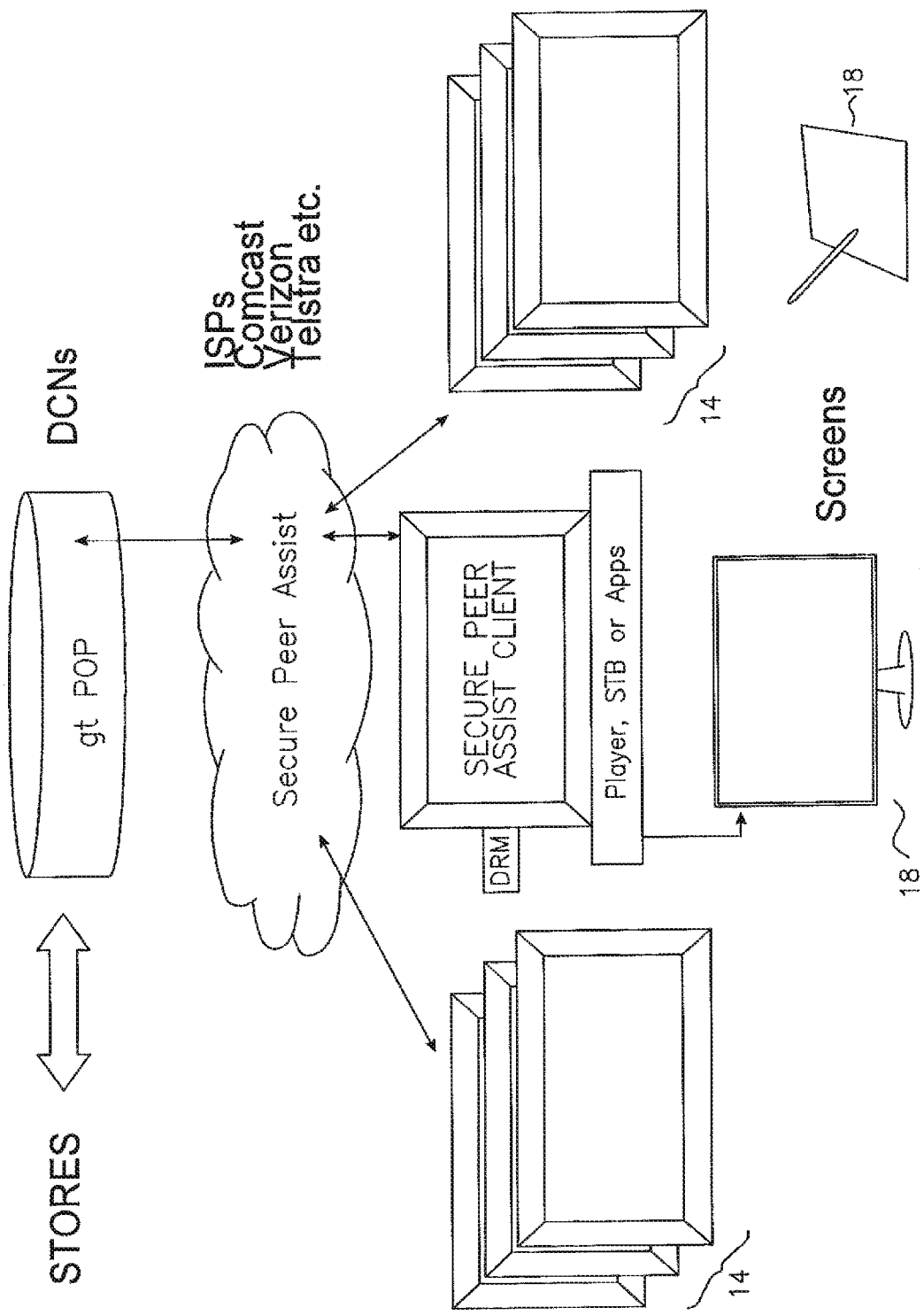
FIG. 5 is a block diagram of a media distribution and management system in accordance with a first implementation example.
Figure 6:
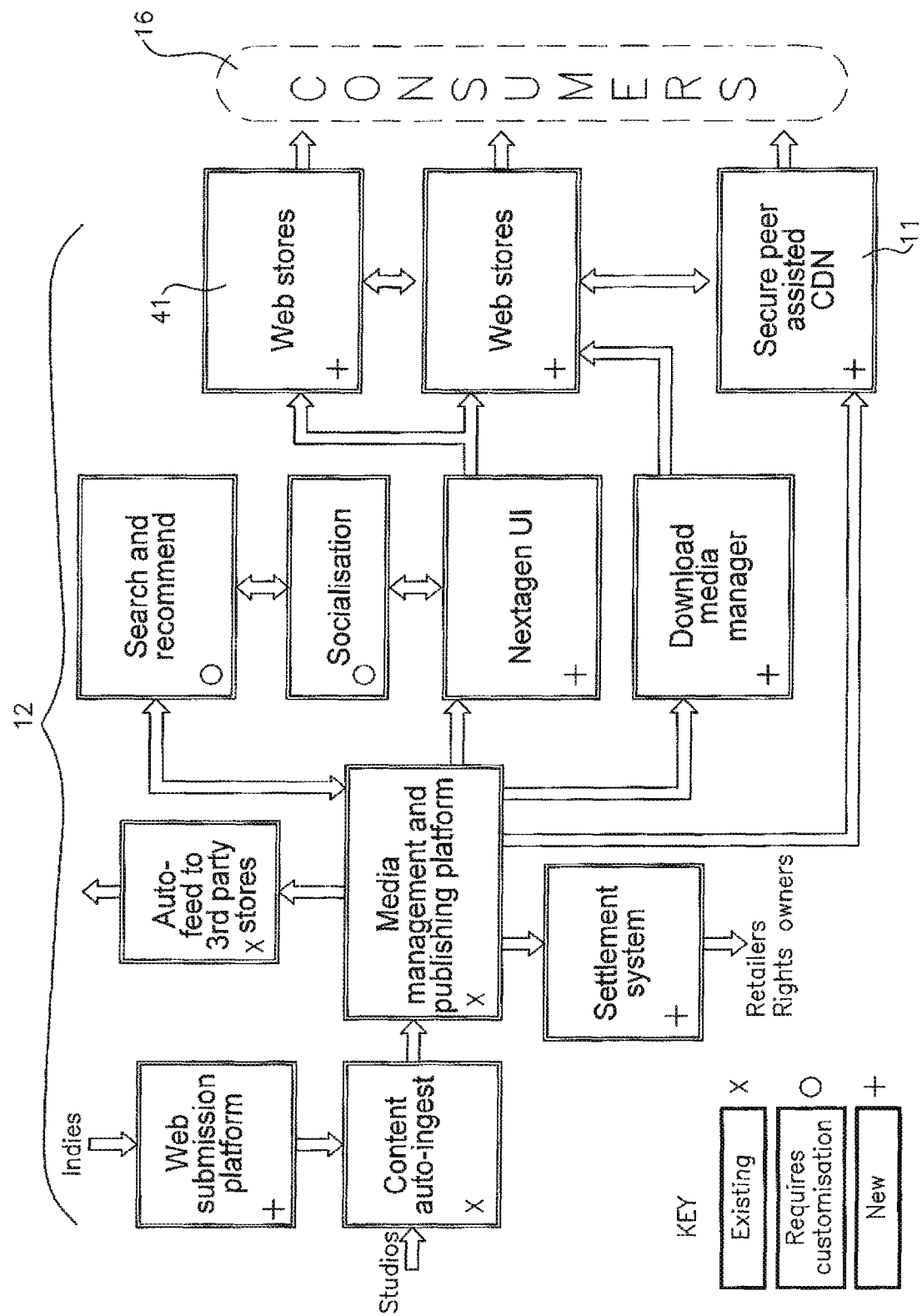
FIG. 6 is a block diagram of the aggregator of the system of FIG. 5

As exemplified in FIGS. 5 and 6 these UI concepts permit streamlined control of operation of the network appliance 14 including most particularly selection of digital content 13 for viewing on the audiovisual display device 18. Significant is the reflection of the physical user experience in the UI e.g. arcs for menus and images, concentric circles (or arcs) to show menus or titles, blending of menu and images, in one embodiment in circles and arcs. In another embodiment menu and images may be displayed in a grid of tiles.

First Example of Implementation

Figure 7:
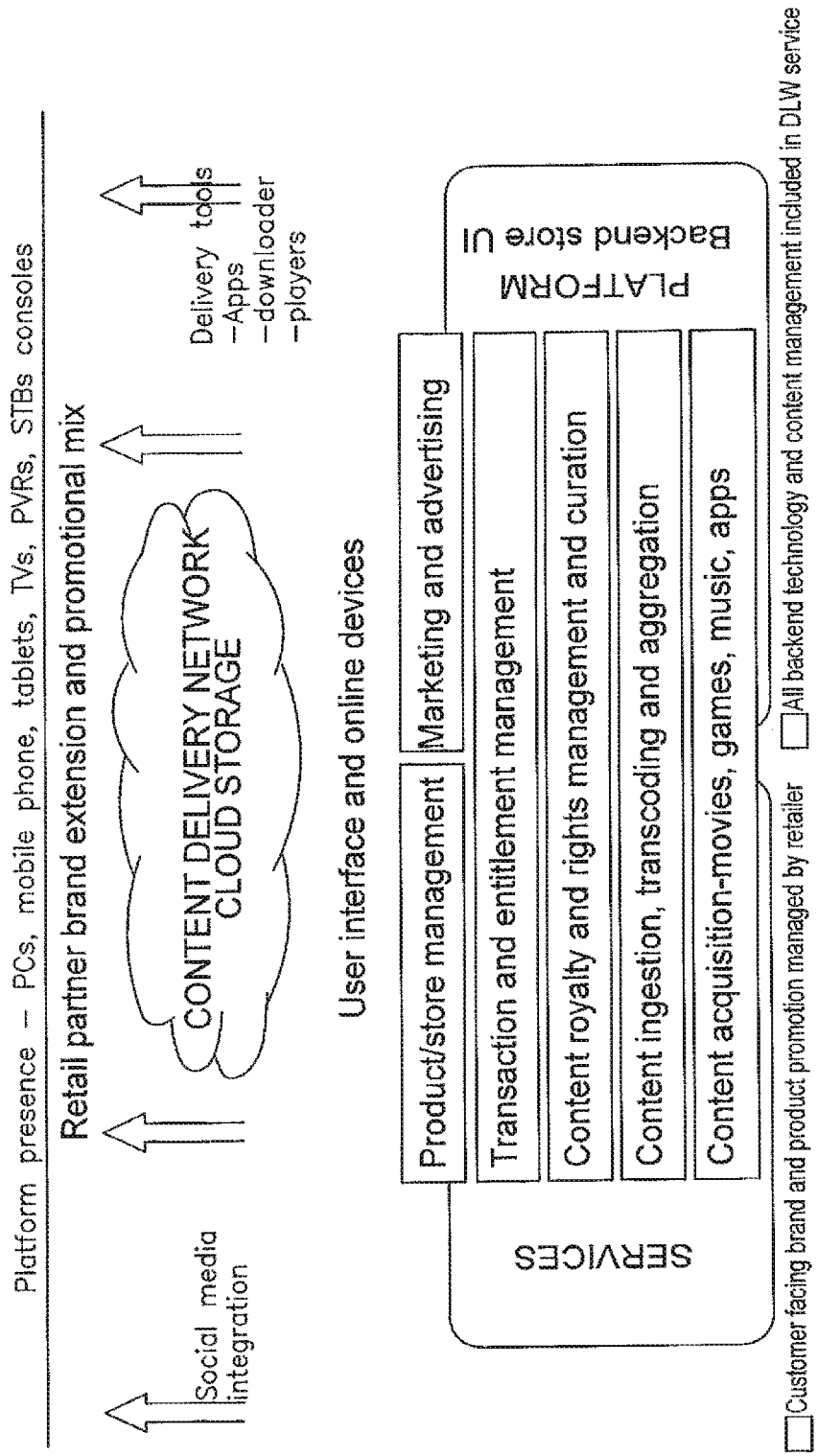
FIG. 7 is a flow chart of service functions which give effect to the aggregator and origin store of the system of FIG. 5

In preferred forms the network appliance 14 includes at least the following capabilities:

- Connect to Internet via WiFi or Ethernet cable
- Connect to TV via HMI or WiFi interface
- Connect to USB or HMI for TV control
- Connect to other devices e.g. tablets, PCs via WiFi or Ethernet
- Secure peer assist criteria network client
- Microsoft PlayReady secure client
- Trusted Execution Environment
- Play Movies, TV and games
- "remote" functions e.g. seek, pause, rewind, fast forward, slow motion via apps or via appliance or smaller version of appliance wirelessly connected to "home" appliance
- Remote functions via TV control, game controller, keyboard, track pad or mouse
- Stream, download and store all content (with mass storage option)
- Sideload games to other game platforms, tablet, phone
- HD and UHD ("4K")
- Manage library including third party content
- securely share content. Content will be DRM protected and a mechanism provided to purchase a key to unlock the content
- Record and send metrics/stats to management systems
- Monitor and manage content behaviour and performance
- Monitor and manage network behaviour and performance
- Media hub The overall topology of the example system can be as illustrated in FIGS. 5, 6 and 7 and having the functional specifications as follows:

Functional Description

Embodiments of the network appliance 14 of the present invention comprise a device operating according to secure peer assist protocol 19 being a portable device for downloading, storing, streaming, playing and sharing high quality movies, games and TV on a TV or connected device. It combines secure peer assist criteria 19 technology and a content origin store 11 and a syndicated retail content web store 41 to provide the latest Hollywood and Indie movies, TV and games in true HD and UHD on a TV. Embodiments of the network appliance 14 address the key issue in OTT and IP TV delivery today: exponential growth of video traffic. In this instance the network appliance 14 provides the flexibility for a new generation of content owners who can choose what they want to watch, when they want to watch it and who and how they want to share it with in true High Definition and Ultra High Definition, all the time.

Functions:

- Connect to Internet via WiFi a, b, g, n, ac or Ethernet cable for download and stream of movies and TV from GT TV store
- Option for Bluetooth e.g. to connect to TV or other devices
- Connect to TV via HDMI v 2.0a and HDCP 2.2 interface or later versions as the standards evolve
- Full HD 1080p60, UHD (4K UHDTV 2160p 3840×2160) and HDCP secure HDMI Connect or via fibre to high quality audio sound systems supporting high quality audio e.g. Dolby 5.1 or 7.1
- Support wide range of video encoding standards including H.264 all codecs
- H.265 HEVC and VP9 and Alliance for Open media codecs
- 3×USB interfaces for connection to other devices, peripherals, TV control
- PSU for power
- Connect to other devices e.g. phone, tablet, PC via WiFi or Ethernet
- Remote control and store purchase initially
- Streaming via Miracast and DRM
- Secure Peer assist network client in secure environment
- Play Movies, TV and games including "remote" functions e.g. seek, pause, rewind, fast forward, slow motion
- Microsoft PlayReady secure client
- Sideload games to other game platforms, tablet, phone via Ethernet, WiFi or USB (future release)
- Stream, download and store all content (with mass storage option.)
- HD and UHD
- Manage library including third party content
- Securely share content
- Record and send metrics/stats to management systems content behavior and performance network behavior and performance
- Media hub
- Universal Plug n Play UPnP Models All models will be designed for a single enclosure to minimise cost of production. This will be a high aesthetic form and function device with a simple and innovative human interface. It will be designed to appeal to the super early adopter market but also the mainstream market. It will be extremely simple to use.

Base model: This is the base model with minimum 2 TB disc and 128 G SSD storage. It will be a fully functional peer in the Secure Peer assist network, enabling high quality download and streaming of movies and TV from the store 41. It will be controlled via the unit, via a phone or tablet app or via TV remote or keyboard, track pad or mouse.

Base model with disk library: This is the base unit with minimum 2 TB 2.5 inch disk drive for storage of movies. It will be capable of storing 200-400 HIS movies or 100 UHD movies, depending on encode size.

SSD model with SSD library: This is the base unit with 250 G-2 TB SSD hard drive. It will store 100 UHD movies, depending on encode size.

Media hub and streaming: This will allow secure streaming of digital content to CE devices such as phones and tablets, and streaming of user's content to the TV.

Network Appliance Control App

The network appliance 14 may be controlled by an app on a phone or tablet. This may be an Android or iOS app initially for iPhone and tablet. Other applications will be implemented in future. It may provide full remote control of all viewing functions, as well as the ability to purchase directly via the network appliance accessible store.

It may optionally also remotely control the TV via USB or Bluetooth if equipped or via the network appliance 14.

Power

In preferred forms, the system must be as low power as possible. The system may be powered by AC power pack. The system may be optionally battery powered.

Operating System

The system may run a secure, real time version of the Linux operating system or the Microsoft Windows operating system.

Architecture

In the example 1 system, the system architecture may be ARM Cortex A9 or later, including ARM TrustZone or it may be Intel Core architecture $6^{th}$ generation or later, including Secure Guard Extensions (SGX), Memory Protection Extensions (MPX), secure enclaves and hardware DRM.

Security

In the example 1 system, all media files will be DRM encrypted. Preferred DRM are Microsoft PlayReady for movies, Ubisoft DRM or Tages Solid Shield for games but other studio approved DRM may be used including Adobe Access and Google Widevine. The system may provide a robust and long term solution where trusted applications are appended in the field over the lifetime of the device. The system may conform to the specification of a Trusted Execution Environment. The system may support trusted boot mode and trusted control of all I/O ports.

The system may support Intel Secure Guard Extensions (SGX), Memory Protection Extensions (MPX), secure enclaves and hardware DRM The system may support secure attestation and sealing The system may support ARM Advanced System Architecture and Base Architecture platforms for digital rights management (DRM) with integration of the TrustZone Address Space Controller (TZASC) to protect areas of the RAM used to hold valuable content.

The architecture may support integration of media accelerators, such as CPU, Video Engine and Display controller, all of which will require knowledge of the processor's security state.

The system may provide tamper protection and real time clock.

The system may support secure hardware cryptographic acceleration to optimize DRM decoding speed. The system may support high assurance boot and recognition of digitally signed software.

The system may support Secure JTAC-JTAG i.e. use is restricted (in the No-Debug level) unless a secret-key challenge/response protocol is successfully executed.

DRM

The system of example 1 in preferred forms will support digital rights management (DRM). Microsoft PlayReady is preferred for movies and TV and Ubisoft DRM or Tages Solid Shield for games initially. Other studio approved DRM e.g. Adobe Access and Google Widevine are alternatives.

Hardware & O/S

Figure 13:
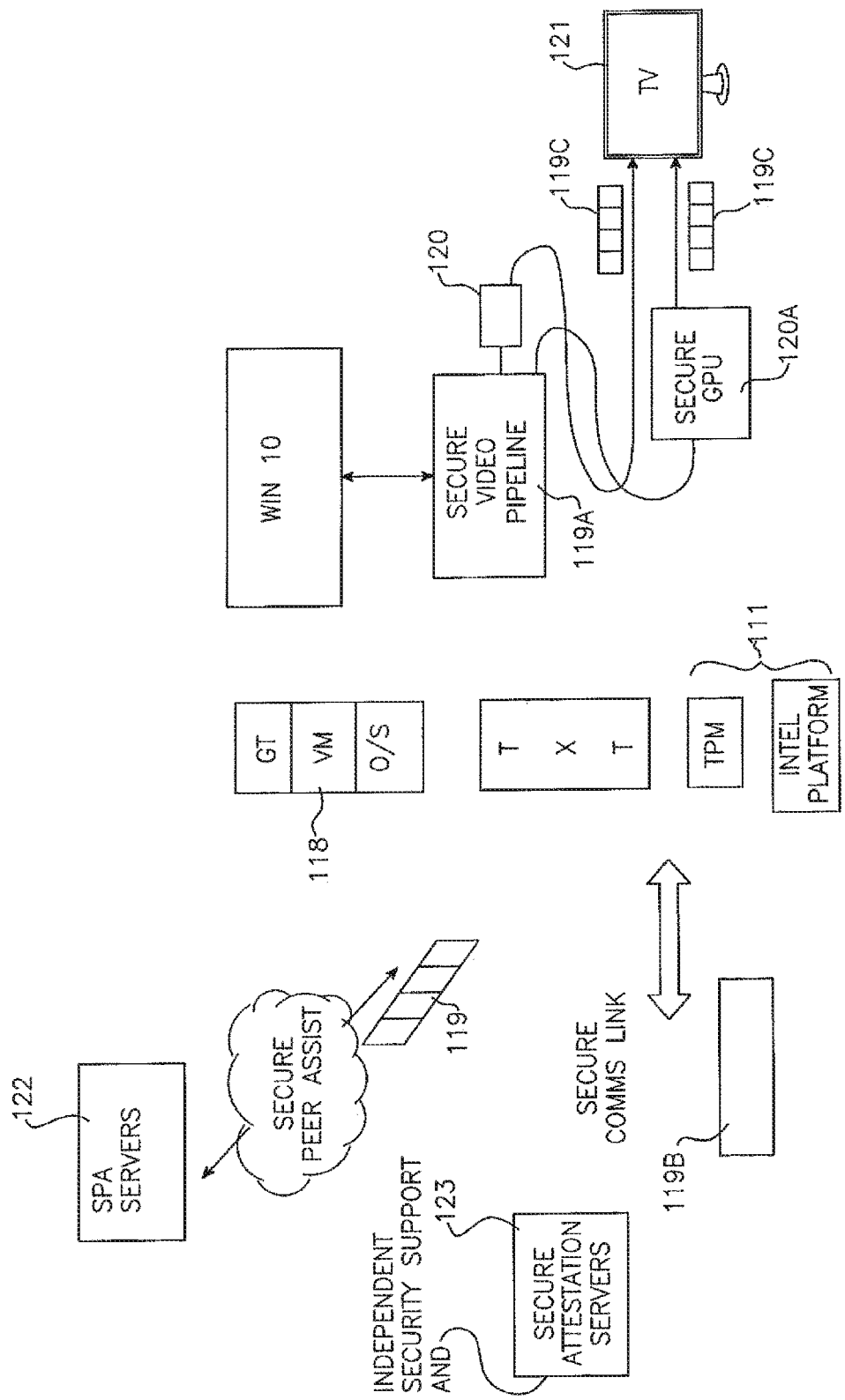
FIG. 13 is a block diagram of data functionality operable with the further embodiment of FIG. 11

CURRENT hardware & O/S specification
    I/O ports/aerials
    AC power adapter
    3×USB 2.0
    1×1000 Mb Ethernet
    HDMI 2.0a connector
    WiFi a, b, g, n, ac
    HiFi sound optical or HDMI
    Mass storage
    2.5 inch disk drive 2 TB minimum
    SSD 128 G-1 TB minimum With reference to FIG. 13 there is illustrated a conceptual flow diagram for syndication of digital content 13.

By way of summary, there is described the system of example 1 and preferably implemented via network appliances 14 of the type described with reference to FIG. 2

Preferred forms of criteria for receipt of data packets at the network appliances operate according to one or more of the following, alone or in combination:

a. most needed packet
    b. fastest download speed
    c. least latency
    d. the network address from where the next digital bit or group of bits can most easily and efficiently be acquired in order to maintain real-time or near real-time delivery of digital content.

Preferably, digital content and more particularly specified items of digital content are DRM 'wrapped', delivered to the network appliances and decoded at the network appliances utilising the Microsoft PlayReady infrastructure.

Figure 10:
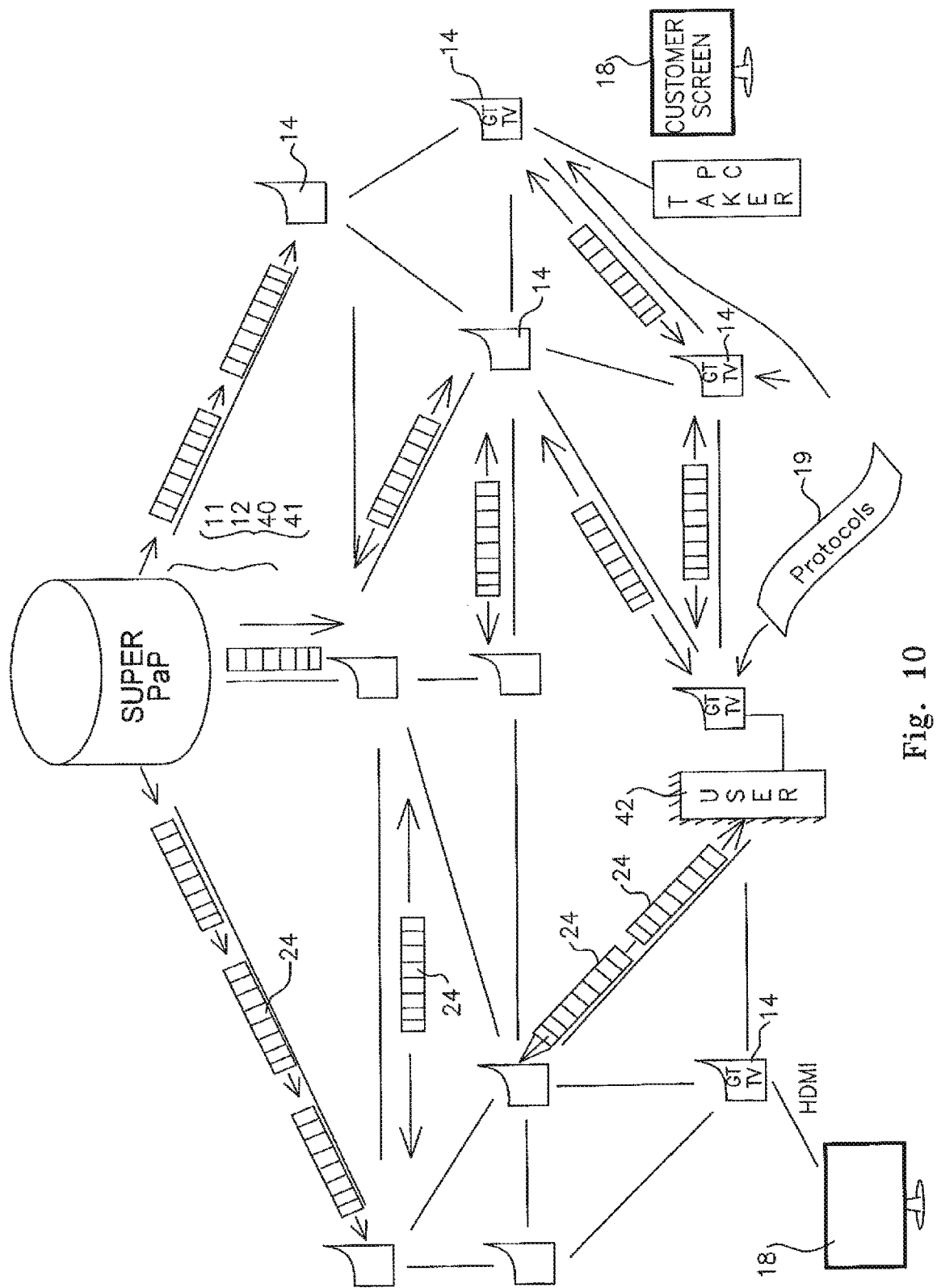
FIG. 10 is a block diagram of an embodiment of the system of FIG. 1 conceptualized from a user perspective.

With reference to FIG. 10 there is illustrated the system 10 conceptualised from a user perspective.

Broadly there is a "super pop" in this instance combining aggregator database 12, origin store 11 and the data packet address database/network management server 40 which, in conjunction with the distributed network appliances 14 and preferably using the Internet as the primary communication channel, orchestrates the efficient and timely delivery of data packets 24 (forming specified items 17 of digital content 13) thereby to allow secure and timely delivery of a wide array of digital content to the user 42.

The system enhances the experience for all stakeholders by providing confidence in the security of the digital data to the originators and rights owners of the digital data whilst also providing a wide array of digital content for the selection of the user 42 all delivered in a controlled and timely manner such that both substantially real-time streaming as well as data download are available over a wide range of Internet connections.

Further Preferred Embodiment

Figure 11:
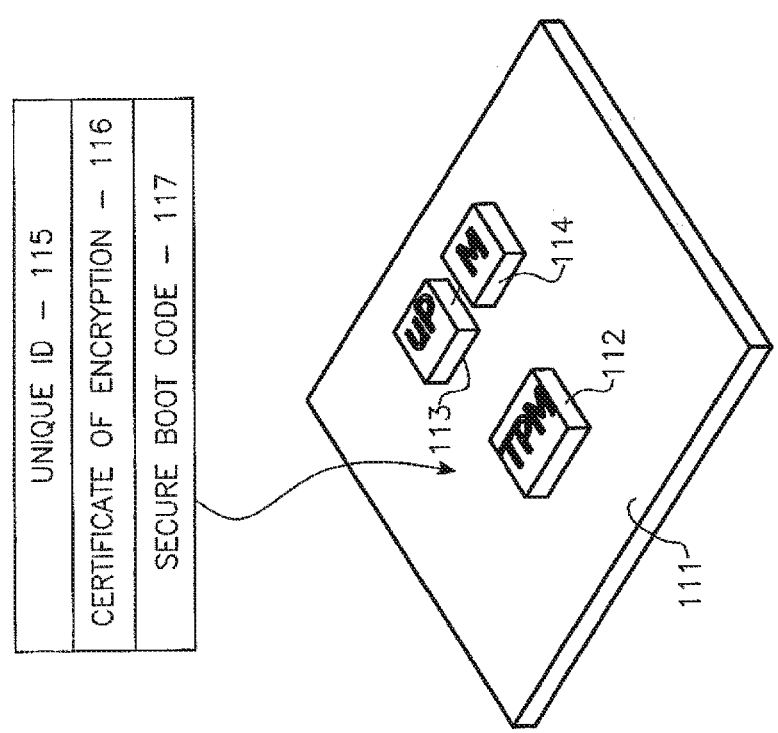
FIG. 11 is a layout diagram of a processor module in accordance with a further embodiment of the present invention.
Figure 12:
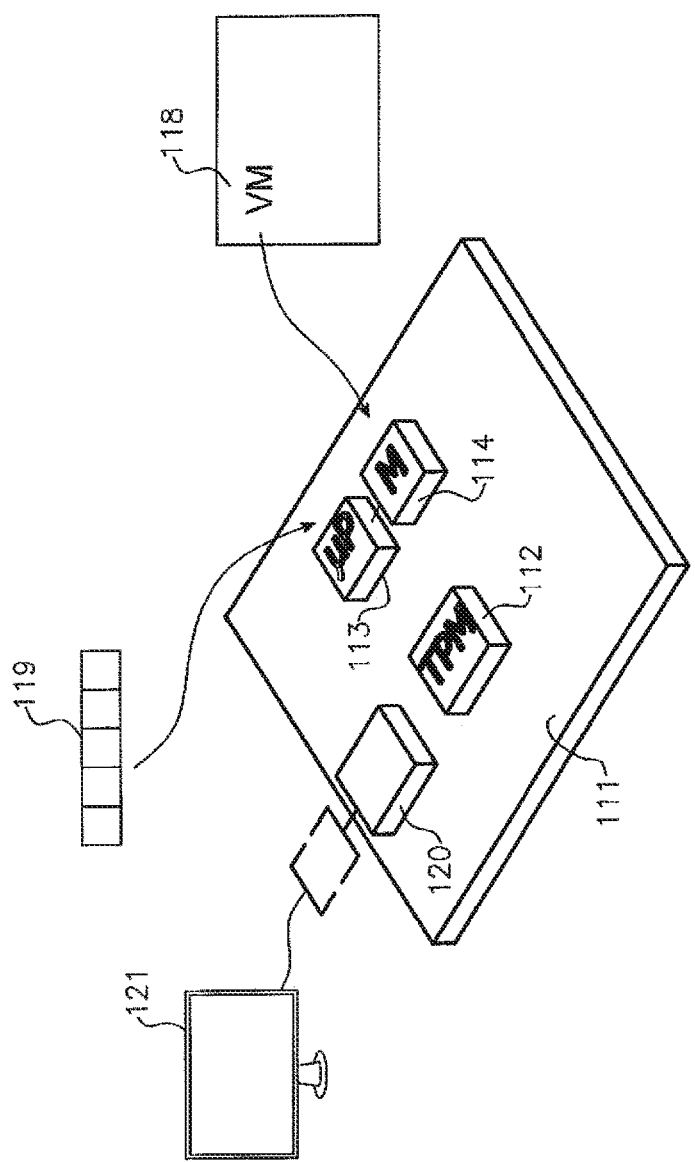
FIG. 12 illustrates diagrammatically some of the module functionality of the module of FIG. 11

With reference to FIGS. 11, 12 and 13 there is illustrated a basic platform and functional implementation of a further embodiment of the present invention which can be implemented using Intel brand chip sets and Microsoft Windows brand software modules.

It will be appreciated that it will be advantageous for at least some embodiments of the present invention to operate in a highly secure state whereby potentially valuable software such as ultra high definition (UHD) movies may be processed without fear of being compromised or made available for unauthorised use.

Typical UHD movies operate according to MPEG4 standards such as H.264 (so called HD definition typically operating at 1080 pixels or lines down the screen) and H.265 (so called 4K or UHD definition operating at 2160 lines or pixels down the screen). A typical file for such a movie may be of the order of 15-20 GB in size. In the present further preferred embodiment the "secure peer assist" arrangement described in earlier embodiments is enabled on a Windows/Intel platform.

With reference to FIG. 11 there is illustrated a circuit board 111 on which is mounted at least a trusted platform module (TPM) 112 in communication with a processor 113 and memory 114. Alternately the TPM may be embodied in the processor 113 or an associated system module.

The trusted platform module 112 includes a unique identifier 115, a certificate for encryption and decryption 116 and secure boot code 117.

The trusted platform module 112 implements Trusted Computing Group architecture in this instance on hardware which is part of the TXT platform available from Intel Corporation providing a Trusted Execution Environment (TEE) incorporating Intel Secure Guard Extensions (SGX), Memory Protection Extensions (MPX), secure enclaves and hardware DRM In a preferred arrangement where the TPM is incorporated in the processor or an associated module the processor supports Intel Secure Guard Extensions (SGX), Memory Protection Extensions (MPX), secure enclaves and hardware DRM In a preferred form DEM is implemented utilising the Microsoft PlayReady environment. In this arrangement UHD 4K content will play if and only if:

a hardware DEM environment is detected that environment is within a trusted execution environment and all video outputs are implemented using a preferred output protocol, in a particular preferred instance being HDCP 2.2.

In operation the trusted platform module 112 permits the processor 113 to enter into a trusted running state.

A preferred operating system loaded into memory 114 for execution by a processor 113 is the Microsoft Windows 10 operating system or a later version.

With reference to FIG. 12 the processor 113 and memory 114 may optionally execute a virtual machine 118 within the Intel architecture environment. The virtual machine 118 permits direct hardware access by an operating system such as the Windows 10 operating system whilst operating within a highly secure environment. A movie file 119 downloaded to memory 114 utilising the secure peer assist arrangement of previous embodiments may be processed and the video stream decoded via hardware DRM and an HDCP Level Shifter Protocol Converter (LSPCON) chip 120 for secure output via HDMI, Display Port or Thunderbolt connection to preferably ultra high resolution display device 121.

Alternately the video stream may be securely routed to a secure GPU 120A for secure output via HDMI.

With reference to FIG. 13 the flow of data on platform 111 is illustrated diagrammatically. The movie file 119 assembled potentially from many sources preferably in the form of secure peer assist platforms 122 is processed by the components including optionally virtual machine 118 operating within a Windows 10 environment utilising hardware DRM providing a highly secure output stream 119A which is processed by a converter chip 120 (preferably an HDCP 2.2 LSPCON chip) in order to output a secure video stream 119C displayable on ultra high resolution display device 121.

The trusted execution environment and stream 119A is secured via data 119B provided from independent security support and attestation servers 123 as illustrated in FIG. 13.

The end result is an output stream 119C to ultra high resolution display device 121 which has been decoded in real time whilst a high level of security has been maintained thereby permitting substantially real time display of very high resolution video files such as UHD 4K definition movie files in accordance with Movielabs and Motion Picture Association of America specifications and individual studio and content owner specifications for high value content.

Figure 14:
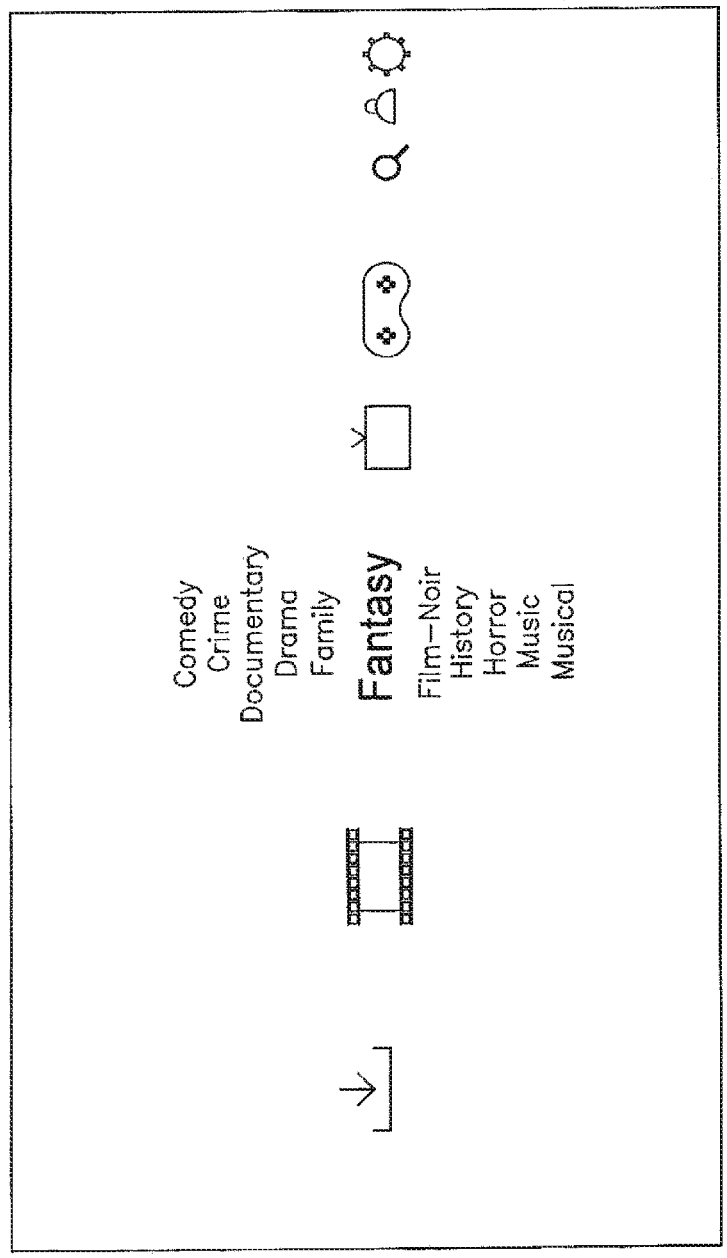
FIG. 14 is a screenshot of a menu screen output from the embodiment of FIG. 11

FIG. 14 is a screenshot of a menu screen output to screen 121 by which a user may select a movie for watching on the display 121.

Figure 15:
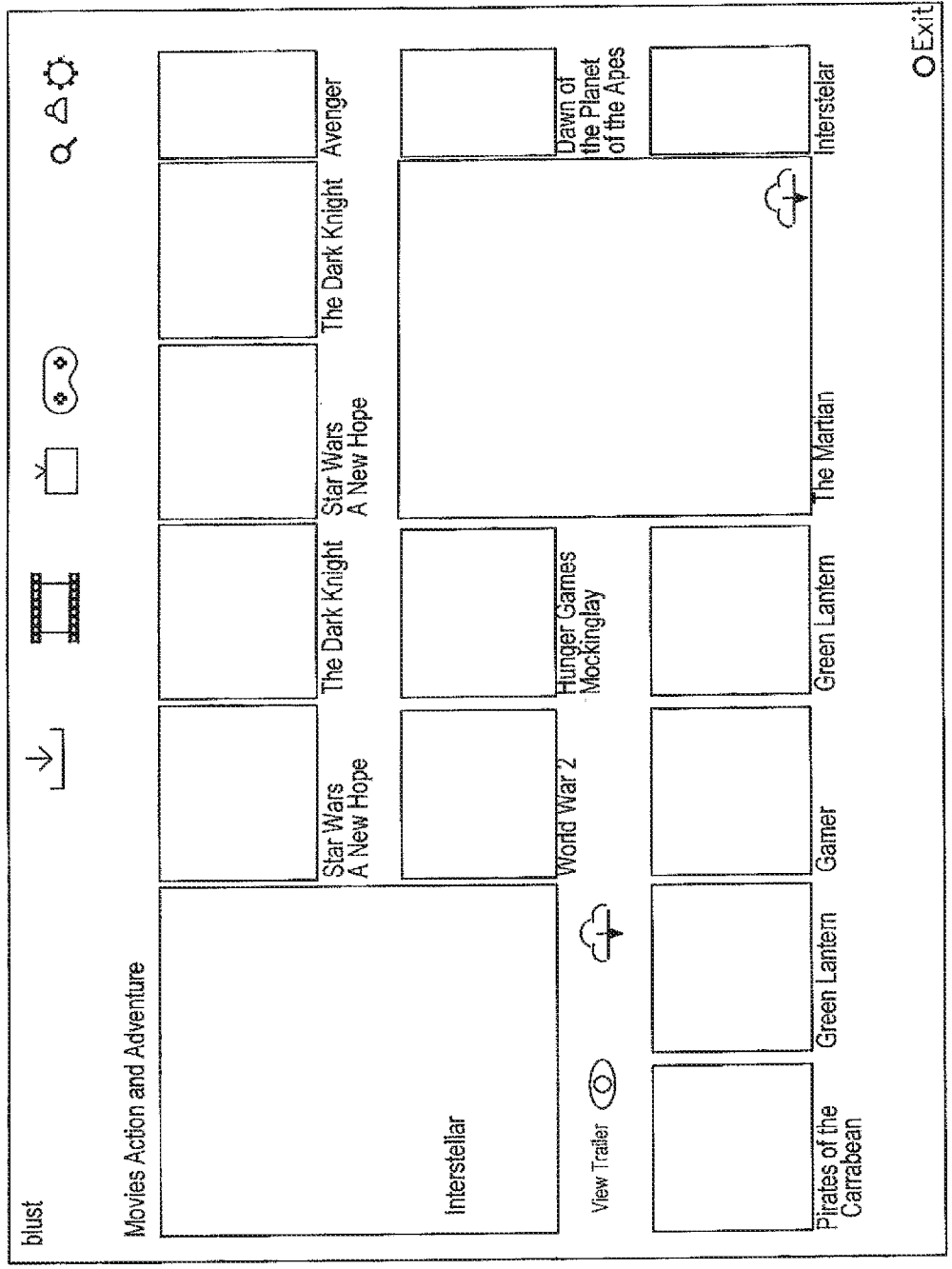
FIG. 15 is a screenshot of a menu selection screen output from the embodiment of FIG. 11

FIG. 15 is a screenshot of a menu selection screen by which a user may select a movie for watching on the display 121 utilising a scrolling arrangement.

Figure 16:
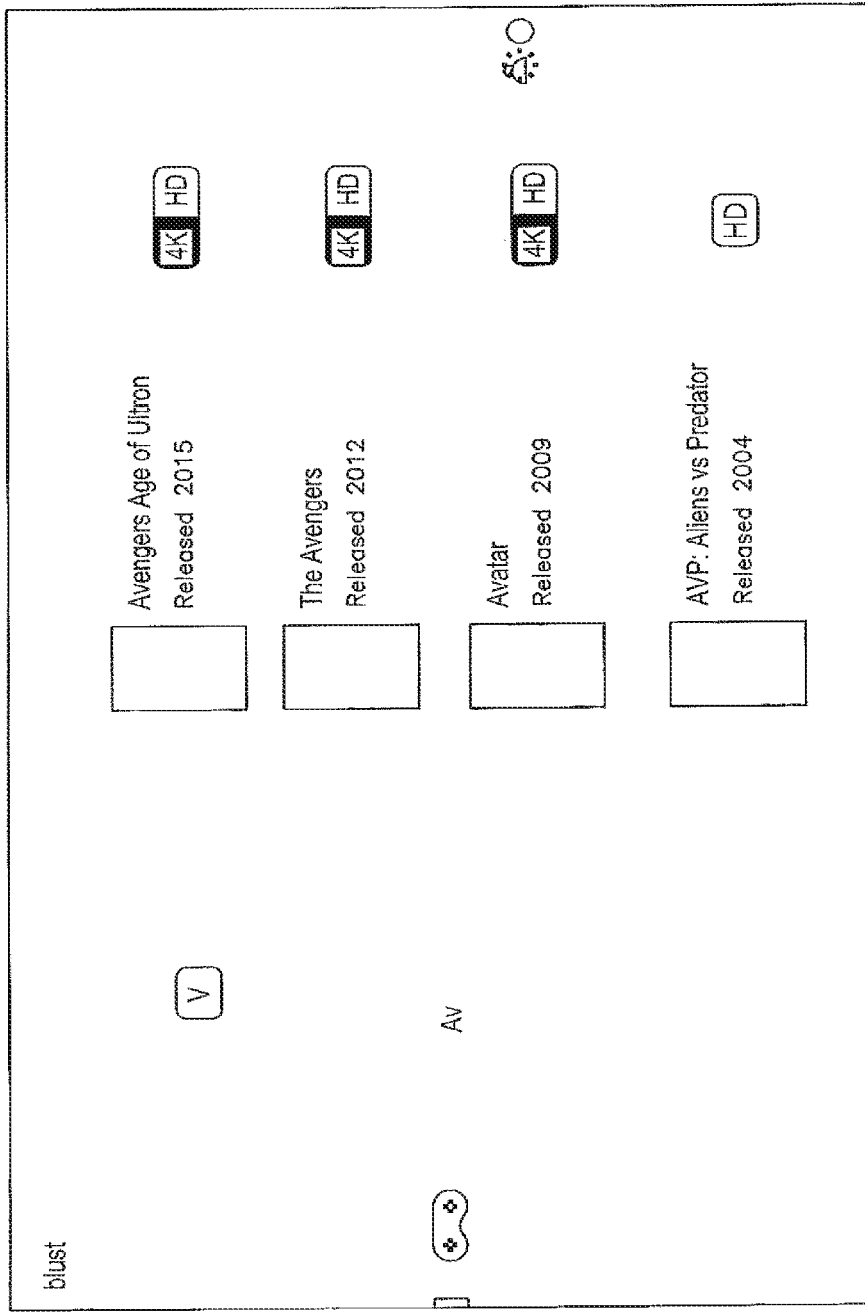
FIG. 16 is a screenshot of a selection screen interface for the embodiment of FIG. 11.

FIG. 16 is a screenshot of a selector screen arrangement.

In particular forms a user may make use of associative technology which clusters items for selection in accordance with predetermined criteria. An example of such a system is described in US 2014/0330841 the description, claims and drawings of which are incorporated here by cross-reference. In particular forms a correlation algorithm is applied between items belonging to a finite set of items wherein each item has an associated visual indicia and at least a set of attributes that are common to every other item belonging to said finite set of items to facilitate discovery of said items within said finite set.

In particular forms a scoring system is used to quantify the degree of correlation.

In a further preferred embodiment, Secure Peer Assist may be "inserted" in or integrated with Adaptive Bit Rate protocols in order to utilise the extensive existing assets and resources that use adaptive bit rate. This may be by direct integration or via an Application Programming Interface (API). Secure Peer Assist would be responsible for network communication and would interface to Adaptive Bit Rate resources such as media servers, video encoders and segmenters, Digital Rights Management systems, key management systems, content distribution networks, video players, browsers, client applications etc. Secure Peer Assist would manage timely delivery of video and other content packets. To the adaptive bit rate protocol it would appear as an optimum single fixed rate stream. In effect this would convert adaptive bit rate into progressive download or optimum fixed rate streaming, depending on available user bandwidth.

In a further preferred embodiment, Secure Peer Assist would be integrated with Dynamic Adaptive Streaming over HTTP (DASH), also known as MPEG-DASH, with Common Encryption and Encrypted Media Extensions (EMS). A proposed name for this arrangement would be DSPASH (Dynamic Secure Peer Assist over HTTP). This preferred embodiment would be integrated with an HTML5 browser supporting Media Source Extensions. This would provide a standardised implementation, capable of the most efficient implementation across a multiplicity of consumer devices.

A further preferred embodiment would use Microsoft PlayReady DRM and the Microsoft Edge HTML5 browser on the above described preferred embodiment of an Intel processor hardware platform implementing PlayReady in hardware under the tightly integrated Microsoft Windows 10 (or later) operating system.

INDUSTRIAL APPLICABILITY

The network appliance may be implemented as standalone hardware units or multiple connected units programmed with the secure peer assist criteria described above. In alternative forms the secure peer assist criteria may be made available for programming into other devices such as smart phones, game controllers, smart TVs and the like.

Server based devices can be used to implement the aggregator 12 and the origin store 11.

The invention claimed is:

1. A network appliance operable in conjunction with a plurality of like network appliances; said network appliance receiving digital content from a remote location; said network appliance receiving digital content from the remote location including a database that may be stored on or form part of the origin store or the database may be a separate server or the database may be stored at least partially in memory of the individual network appliances in order to provide a distributed storage arrangement; said network appliance including decoding and recoding means by which digital content is downloaded, decoded then recoded for transmission to a digital device for consumption by a user;
   said each network appliance forming an intelligent node in a mesh network;
   each said network appliance communicating over the mesh network with reference to network addresses;
   wherein each network appliance operates according to secure peer assist routing criteria, including the use of secure protocols for data transmission; said secure peer assist routing criteria enabling reception of at least portions of said item of content from others of said plurality of network appliances if said item of content has been previously downloaded to said others of said plurality of network appliances;
   and wherein each said network appliance receives said digital content from the network address from where the next digital bit or group of bits can most easily and efficiently be acquired in order to maintain real-time or near real-time delivery of digital content;
   and wherein the digital content is recoded according to secure coding algorithms;
   and wherein each said network appliance receives said digital content according to said secure peer assist routing criteria comprising one or more of:
      a. most needed packet
      b. fastest download speed
      c. least latency
      d. the network address from where the next digital bit or group of bits can most easily and efficiently be acquired in order to maintain real-time or near real-time delivery of digital content;
   said next digital bit or group of bits being obtained from at least one of:
      a. the local network appliance feed,
      b. a peer feed, and
      c. server feed
   based on distributed and/or centralized routine information in the form of hash tables or other efficient database mechanisms; said routing information including address information for all data packets that will form said digital content;
   said Secure peer assist criteria and application programs based on them being aware of and reporting network traffic at the SCTP, TCP/IP, UDP and video packet level, each network appliance forming an intelligent node in a mesh network described as grid computing or distributed cloud computing; said Secure Peer Assist criteria combining distributed and centralised routine information and intelligence down to the video packet level enabling optimum management of the network with Software Defined Network like capability.

2. A distributed system for delivery of digital content; said system comprising at least one content aggregator in communication with an origin store; a plurality of network appliances; the aggregator receiving digital content in the form of items of content; the aggregator securing the digital content for distribution by the system; the origin store making available the digital content to said plurality of network appliances; each network appliance receiving specified items of content on request to said system by a said network appliance; and wherein the network appliance operates according to secure peer assist routing criteria, including the use of secure protocols for data transmission; said secure peer assist routing criteria enabling reception of at least portions of said item of content from others of said plurality of network appliances if said item of content has been previously downloaded to said others of said plurality of network appliances; said network appliances receiving digital content from a remote location including a database that may be stored on or form part of the origin store or the database may be a separate server or the database may be stored at least partially in memory of the individual network appliances in order to provide a distributed storage arrangement;
   and wherein the digital content is recoded according to secure coding algorithms;
   and wherein each said network appliance receives said digital content according to said secure peer assist routing criteria comprising one or more of;
      a. most needed packet
      b. fastest download speed
      c. least latency
      d. the network address from where the next digital bit or group of bits can most easily r and efficiently be acquired in order to maintain real-time or near real-time delivery of digital content;
   said next digital bit or group of bits being obtained from at least one of:
      a. the local network appliance feed,
      b a peer feed, and
      c. server feed
   based on distributed and/or centralized routine information in the form of hash tables or other efficient database mechanisms;
   said Secure peer assist criteria and applications programs based on them being aware of and reporting network traffic at the SCTP, TCP/IP UDP and video packet level; each network appliance forming an intelligent node in a mesh network described as grid computing or distributed cloud computing; said Secure Peer Assist criteria combining distributed and centralised routing information and intelligence down to the video packet level enabling optimum management of the network with Software Defined Network like capability; thereby providing comprehensive Qualify of Service (QoS) monitoring and control for the entire network.

3. The system of claim 2 wherein said system communicates over the Internet.

4. The system of claim 2 wherein the appliance is implemented on circuit board on which is mounted at least a trusted platform module (TPM) in communication with a processor and memory.

5. The system of claim 4 wherein the TPM may be embodied in the processor or an associated system module.

6. The system of claim 4 wherein the trusted platform module includes a unique identifier, a certificate for encryption and decryption and secure boot code.

7. The network appliance of claim 1 wherein said network appliance receives additional securing data from an independent server.

8. The network appliance of claim 1, implemented using a virtual machine environment giving direct hardware access to an operating system.

9. The network appliance of claim 8 wherein the operating system is Windows 10 tightly integrated with an Intel processor hardware platform implementing PlayReady in hardware under the Microsoft Windows 10 (or later) operating system.

10. The system of claim 2 wherein said secure peer assist criteria are inserted in or integrated with Adaptive Bit Rate protocols.

11. The system of claim 10 wherein the Adaptive Bit Rate is converted into progressive download or optimum fixed rate streaming depending on available user bandwidth.

12. The system of claim 2 wherein said secure peer assist criteria are integrated with Dynamic Adaptive Streaming over HTTP.

* * * * *